US012755034B1

(12) United States Patent
Lee

(10) Patent No.: US 12,755,034 B1
(45) Date of Patent: Oct. 6, 2026

(54) PERMIT-GATED CHILD-AI COMPANION SAFETY RAILS

(71) Applicant: Yong Bok Lee, Sheridan, WY (US)

(72) Inventor: Yong Bok Lee, Sheridan, WY (US)

(73) Assignee: The Crown and the Cross LLC, Sheridan, WY (US)

( * ) Notice: Subject to any disclaimer, the term of this patent is extended or adjusted under 35 U.S.C. 154(b) by 0 days.

(21) Appl. No.: 19/565,357

(22) Filed: Mar. 12, 2026

Related U.S. Application Data

(60) Provisional application No. 63/927,252, filed on Nov. 29, 2025.

(51) Int. Cl.
*G06F 21/60* (2013.01)
*G06F 21/53* (2013.01)
*G06F 21/64* (2013.01)

(52) U.S. Cl.
CPC ............ *G06F 21/602* (2013.01); *G06F 21/53* (2013.01); *G06F 21/64* (2013.01)

(58) Field of Classification Search
None
See application file for complete search history.

(56) References Cited

U.S. PATENT DOCUMENTS 8,640,190 B1 1/2014 Banerjee
9,172,705 B1 10/2015 Kong et al.
9,665,733 B1 5/2017 Sills et al.
10,942,991 B1 * 3/2021 Kidd .................... G06F 16/954
10,962,939 B1 3/2021 Das et al.
2007/0098225 A1 5/2007 Piccionelli et al.
2007/0245398 A1 10/2007 Roden
2013/0017806 A1 1/2013 Sprigg et al.
2013/0065555 A1 3/2013 Baker et al.
2015/0180746 A1 6/2015 Day, II et al.
2016/0360415 A1 12/2016 Dorfman et al.

(Continued)

OTHER PUBLICATIONS

M. Liberato, A. Affinito, B. Meijerink, M. Jonker, A. Botta and A. Sperotto, "To Block or Not to Block? Evaluating Parental Controls Across Routers, DNS Services, and Software," 2025 9th Network Traffic Measurement and Analysis Conference (TMA), Copenhagen, Denmark, 2025, pp. 1-10, (Year: 2025).*

(Continued)

*Primary Examiner* — Philip J Chea
*Assistant Examiner* — James Ross Hollister

(57) ABSTRACT

Systems govern child-AI companion episodes using permit-before-interaction, fail-closed safety rails with tamper-evident receipts. A child profile is bound to a parent or guardian record. Child safety constraints are encoded in an Immutable Companion Constraint (ICC) chain anchored in an append-only Merkle log with signed heads and inclusion and consistency proofs. For an episode, a context envelope is evaluated against a child safety policy graph constrained by the ICC chain to determine a disposition and a risk budget. When permitted, a cryptographically signed child safety permit is minted. A Companion Safety Interceptor in an output path validates the permit, computes cumulative risk over streaming output units, and allows, truncates, buffers, replaces, or suppresses content under fail-closed semantics. A child safety receipt describing the episode and policy path is appended to a child safety receipt ledger.

30 Claims, 10 Drawing Sheets

(56) References Cited

U.S. PATENT DOCUMENTS

| | | | | |
|---|---|---|---|---|
| 2017/0149795 | A1 | 5/2017 | Day, II | |
| 2018/0007433 | A1 | 1/2018 | Chowdhury et al. | |
| 2020/0134095 | A1 | 4/2020 | Weldemariam et al. | |
| 2021/0133341 | A1 | 5/2021 | Gupta et al. | |
| 2022/0284884 | A1* | 9/2022 | Tongya | G06F 40/35 |
| 2023/0396414 | A1 | 12/2023 | Formaini et al. | |
| 2023/0401492 | A1* | 12/2023 | Platten | G06N 20/20 |
| 2025/0008187 | A1 | 1/2025 | Golyshko et al. | |

OTHER PUBLICATIONS

S. Ananth, P. JayaPriya, S. Kishore, B. Pravin, R. Sathish Kumar and V. Thamizhmani, "AI-Powered Child Protection with Instant Content Redirection," 2025 2nd International Conference on Computing and Data Science (ICCDS), Chennai, India, 2025, pp. 1-4, (Year: 2025).*

R. Ahmed et al., "Smart Child Monitoring System with Real-Time Danger Detection Using Artificial Intelligence," 2025 Twelfth International Conference on Intelligent Computing and Information Systems (ICICIS), Cairo, Egypt, 2025, pp. 771-776, (Year: 2025).*

K. P, C. M. B, D. J. P, G. N and P. Parthsarathy, "AI-Driven Child Safety System: Real-Time Fear Detection and Emergency Response using Enhanced Deep Learning Algorithms, " 2025 2nd International Conference on RMKMATE, Chennai, India, 2025, pp. 1-8, (Year: 2025).*

Laurie, Messeri, Stradling, "Certificate Transparency Version 2.0," RFC 9162, Dec. 2021.

Birkholz, Thaler, Richardson, Smith, Pan, "Remote ATtestation procedureS (RATS) Architecture," RFC 9334, Jan. 2023.

NIST Special Publication 800-207, "Zero Trust Architecture," Aug. 2020.

Verifiable Credentials Working Group, "Verifiable Credentials Data Model v2.0," W3C Recommendation, May 15, 2025.

Hanaoka, Ngan, Yang, Quinn, Hom, Grother, "Face Analysis Technology Evaluation: Age Estimation and Verification," NIST IR 8525, May 2024.

Bonawitz et al., "Practical Secure Aggregation for Federated Learning on User-Held Data," NIPS Workshop on Machine Learning, 2016.

Palazzo et al., "Privacy-Preserving Data Aggregation with Public Verifiability Against Internal Adversaries," USENIX Security 2024.

Common Sense Media, "AI Risk Assessment: Social AI Companions," last updated Apr. 10, 2025.

Rezaee Borj, Raja, Bours, "Detecting Online Grooming By Simple Contrastive Chat Embeddings," IWSPA '23, Apr. 24, 2023.

Subramanyam et al., WWW '24: Proc. ACM Web Conf. 2024, doi:10.1145/3589334.3648142.

* cited by examiner

CHILD SAFETY PERMIT 300

- PERMIT IDENTIFIER 302
- CHILD PROFILE ID 304
- PARENT/GUARDIAN ID 306
- AGE TIER 308
- EPISODE SCOPE 310
- RISK BUDGET 312
- EXPIRY TIMESTAMP 314
- ICC HEAD REF 316
- POLICY SNAPSHOT REF 318
- DIGITAL SIGNATURE 320
- SESSION BINDER 322 (OPT.)

CHILD SAFETY RECEIPT 350

- RECEIPT IDENTIFIER 352
- PSEUDO CHILD ID 354
- AGE TIER 356
- DEVICE ID 358
- TIMESTAMP / RANGE 360
- PERMIT IDENTIFIER 362
- DISPOSITION 364
- SAFETY EVENT CODES 366
- POLICY PATH 368
- HASHES / COMMITMENTS 370
- SIGNATURES 372
- ANTI-REPLAY TUPLE 374 (OPT.)
- BUDGET DELTA 376 (OPT.)
- BINDER REF 378 (OPT.)

FIG. 3

PERMIT-GATED CHILD-AI COMPANION SAFETY RAILS

PRELIMINARY STATEMENTS, PRIORITY, AND RELATED APPLICATIONS

A. Preliminary Statements

Non-Trademark Notice. "Kids AI Companion Safety Rail," "K-ACSR," "ICC," "Child Safety Permit," and "Child Safety Receipt" are technical labels used for convenience; no trademark rights are asserted.

No admission. Identification of any law, regulation, guideline, standard, platform practice, or market example is not an admission of prior art or common general knowledge.

No § 112(f) intended absent "means for." No element is intended to invoke 35 U.S.C. § 112(f) unless expressly recited using "means for."

Order of precedence. If inconsistent, the claims control, then the Detailed Description, then the Figures, then any Appendices. Unless expressly stated, Appendices are illustrative and audit-oriented only and do not alter fail-closed semantics.

Single inventive concept statement (illustrative; non-limiting). The claims are directed to a single general inventive concept: a non-bypassable, permit-gated streaming output control path for child-AI companion episodes that (i) binds episode-level permits to parent or guardian records and child profiles, (ii) constrains episode evaluation by a cryptographically verifiable, append-only ICC constraint chain anchored to signed heads with append-only-evolution proofs, (iii) enforces fail-closed gating of child-facing output rendering or actuation prior to delivery, and (iv) emits tamper-evident Child Safety Receipts appended to an append-only receipt ledger for guardian and oversight verification. Dependent claims recite policy-bound embodiments of the same episode-gate nucleus, including, by way of example and without limitation, age-assurance inputs, sandbox mode, multi-harm risk budgets, multimodal output-unit gating, CSAM override and evidence-bundle workflows, federated evidence services, and device-level double-lock permits; the claims control.

Claim-construction and open-term reminder (illustrative; non-limiting). Terms such as "comprising," "including," and "based on" are open-ended; the singular includes the plural; and "or" is inclusive unless context requires otherwise. Examples are illustrative: functional equivalents are in scope; and no example limits the claims.

Additional inventive aspects (illustrative; non-limiting). In some embodiments, the episode-gate nucleus further includes: (i) cryptographic session binding of permits to an attested transport channel and/or proof-of-possession device key to prevent cross-device replay; (ii) trusted-time and anti-replay tuples recorded in receipts and/or permit leases; (iii) lease-and-refresh semantics requiring periodic revalidation of signed-head freshness and consistency under a maximum-merge-delay (MMD) policy; (iv) revocation propagation to follow-on privileges such as export, replay, sharing, or training-ingest of episode artifacts; (v) amplification permissions governing distribution, forwarding, or boosting of minor-facing content; and/or (vi) a youth-policy virtual machine executed in a trusted execution environment (TEE), such that policy evaluation and pre-render latches are attestably non-bypassable; the claims control.

Additional continuation-ready extensions (illustrative; non-limiting). In some embodiments, the same episode-gate nucleus further governs: (i) memory-write, memory-read, and memory-resurfacing privileges controlling whether child-derived content may be persisted, retrieved, summarized, embedded, or surfaced across episodes; (ii) controlled follow-on action permits for outbound messaging, contact-graph changes, location disclosure, posting, joining, invitation flows, purchases, subscriptions, or sensor-activation workflows initiated by, recommended by, or mediated through a child-facing companion; (iii) cross-episode attachment-drift accumulators and relational-harm budgets computed from repeated secrecy cues, exclusivity framing, simulated-affection escalation, discouraged trusted-adult disclosure, or re-contact pressure; (iv) bounded offline-grace operation using cached signed-head bundles, trusted counters, and reconnect reconciliation receipts; (v) policy-change governance requiring signed policy-update manifests, threshold approvals, staged rollout scopes, and policy-change receipts; and/or (vi) delegated supervisory tokens that provide time-bounded, role-scoped supervision by a school, clinic, camp, household, or caregiver without severing a parent- or guardian-bound accountability chain. Each such extension remains subject to the same parent- or guardian-bound permit issuance, non-bypassable fail-closed pre-render or pre-action gating, and tamper-evident receipt-ledger verification model described herein; the claims control.

B. Priority and Related Applications

Priority and incorporation (illustrative; non-limiting). This application claims the benefit under 35 U.S.C. § 119(e) of U.S. Provisional Patent Application No. 63/927,252, filed Nov. 29, 2025 (the "Provisional"). The Provisional is incorporated by reference only to the extent permitted under 37 C.F.R. § 1.57 and only for non-essential subject matter. All essential material supporting the claims is provided explicitly herein; essential material is not incorporated by reference. In the event of inconsistency, the present disclosure controls; the claims control.

Related applications (illustrative; non-limiting). In some embodiments, the present disclosure may interoperate with one or more related governance rails, trusted sensor or context-capture layers, and/or device-level render-control layers. Any such related application(s), if referenced herein, are incorporated by reference only to the extent permitted under 37 C.F.R. § 1.57 and only for non-essential subject matter, consistent with [0009]. In the event of inconsistency, the present disclosure controls; the claims control.

FIELD

The present disclosure relates generally to governance of AI-mediated interactions involving minors, and more particularly to systems and methods for governing child-facing AI companions, toys, and conversational agents using permit-gated, fail-closed safety rails, cryptographically verifiable constraints, and tamper-evident Child Safety Receipts. In various embodiments, the disclosed techniques govern multimodal outputs and child-facing output actuation, including, without limitation, display, audio, haptics, lighting, animation, and other device outputs, by enforcing permit-before-interaction and, in some embodiments, permit-before-render semantics; the claims control.

BACKGROUND

Evidence-only domain references; no admission. Any reference herein to a law, regulation, standard, guideline, platform policy, market practice, incident, or public discussion is provided for contextual background and compliance-motivation illustration only and is not an admission that such reference constitutes prior art or common general knowledge, or that any requirement applies to any particular embodiment. The described embodiments are technology- and jurisdiction-agnostic unless expressly stated; the claims control.

AI-mediated companions, conversational agents, and "smart toys" are increasingly deployed in homes, schools, clinics, and other environments where children are present. Examples include AI-enabled plush toys, conversational robots, mobile applications that provide "AI friends," in-home voice assistants configured with child-focused modes, and avatar-based companions operating in AR/VR or game environments.

Such systems can provide educational value, companionship, and supportive interaction; however, they also introduce new categories of risk, including, without limitation: (i) exposure to age-inappropriate, harmful, or exploitative content (e.g., explicit sexual material, self-harm ideation or instructions, substance use, violence), including attempts to generate, share, solicit, or normalize child sexual abuse material (CSAM) or other child sexual exploitation imagery, whether captured from the physical world or synthesized; (ii) amplification of harmful behavioral patterns (e.g., disordered eating, bullying, harassment, extreme self-deprecation, coercive challenges); (iii) manipulation, grooming, or exploitation of a child's emotional attachment to an AI companion, including unhealthy dependency, secrecy-keeping prompts, or authority/identity spoofing; (iv) unauthorized collection, misuse, leakage, or secondary use of sensitive data about minors and their families; and (v) insufficient auditability, accountability, and oversight of how child-AI interactions are filtered, shaped, interrupted, escalated, and recorded over time.

Existing controls for child-facing systems are typically implemented as one or more of: static keyword filters, blocklists, rating-based content filters, account-level parental controls, device-level "kids modes," or ad hoc safety prompts. Such controls often operate at coarse granularity (account/device rather than episode), are difficult to validate against evolving risks, are frequently opaque to guardians and oversight entities, and typically do not provide machine-verifiable evidence that specific constraints were enforced for a specific interaction episode. Further, many controls are not positioned in the streaming control path between model outputs and child-facing rendering, enabling unsafe partial outputs, multimodal fragments, or action-driving outputs to reach a child device before an intervention can occur.

Regulators, standards bodies, and institutional buyers are increasingly calling for stronger protections for children in online and AI-mediated environments, including, in various proposals, policies, and guidance: age assurance, parental consent and accountable guardianship, default-safe configurations, duties of care for interaction safety, and auditable governance processes. In some jurisdictions or contractual regimes, providers may be expected or required to implement safeguards such as suicidal-ideation interruption and referral to crisis services, periodic non human disclosure for companion experiences, session-duration interruption (e.g., breaks, bedtimes, curfews), and publicly auditable reporting of safety protocols and incident metrics. These developments further underscore the need for verifiable, episode-level governance rails that can both enforce safety constraints in real time and produce durable evidence of compliance.

In some jurisdictions, regulators have additionally promulgated rules, guidance, or enforcement approaches that treat commercial websites or services offering substantial amounts of pornographic or otherwise harmful content as subject to robust age-verification or age-assurance obligations, and in some enforcement contexts, the failure to implement effective age assurance measures may be characterized under consumer protection theories. Other proposals and laws contemplate time-based usage limits, curfews, or default-safety settings for minors. Such developments further underscore the need for child-specific safety rails that can consume age-assurance artifacts, enforce time- and context-aware policies, and provide verifiable evidence of compliance to guardians and oversight entities while minimizing unnecessary identity-handling.

Accordingly, there is a need for a child-specific safety rail that treats each child-AI companion interaction as a governed episode, binds that episode to an accountable parent/guardian or caregiver of record, enforces explicit constraints in a cryptographically verifiable manner, prevents unpermitted outputs (including multimodal outputs and output actuation) from being rendered to a child device under fail-closed semantics, and leaves behind an append-only, tamper-evident trail of child safety receipts suitable for parental review, operational monitoring, and regulatory or audit oversight; the claims control.

SUMMARY

In some embodiments, the present disclosure provides systems and methods for a Kids AI Companion Safety Rail ("K-ACSR") that sits in a control path between one or more AI models and a plurality of child devices. The safety rail enforces a permit-before-interaction model by inserting a streaming safety interceptor into an output path between the models and the devices. The interceptor verifies that a valid, short-lived Child Safety Permit exists for each child-AI companion episode, and blocks, truncates, or replaces streaming outputs in a fail-closed manner when permits are absent, invalid, revoked, exhausted, or otherwise non-compliant; the claims control. In some embodiments, the technical improvement is a non-bypassable, permit-gated streaming output control path with tamper-evident receipts, rather than post hoc filtering or mere account-level settings; the claims control.

In some embodiments, a system includes one or more processors and a non-transitory memory storing instructions that cause the system to: (i) register child profiles and bind them to parent or guardian records; (ii) encode child-specific safety constraints into an Immutable Companion Constraint (ICC) chain anchored in a cryptographically tamper-evident log that publishes signed heads and supports Merkle tree-based inclusion and consistency proofs; (iii) perform age and consent verification for child users, assigning age tiers and confidence scores; (iv) for each candidate child-AI companion episode, construct a context envelope containing child, device, configuration, and history features; (v) evaluate the context envelope against a Child Safety Policy Graph constrained by the ICC chain to determine a disposition and a risk budget; (vi) responsive to a permitted disposition, mint a short-lived, cryptographically signed Child Safety Permit bound to a child profile and a parent or guardian record and specifying at least a scope, an expiry, and a risk budget; (vii) route streaming outputs from one or more AI models through a Companion Safety Interceptor that verifies the permit and enforces a risk-budgeted, fail-closed gate before rendering outputs to child devices; and (viii) emit Child Safety Receipts for episodes and append them to a Child Safety Receipt Ledger implemented as an append-only Merkle tree log with signed heads; the claims control.

In some embodiments, age and identity assurance can be delegated to a trusted sensor or operating system layer, which issues an age- and device-bound credential or artifact that attests to an age tier and an age-assurance confidence level. The Kids AI Companion Safety Rail can consume such age-assurance artifacts as part of the context envelope and permit evaluation without directly handling underlying identity documents, thereby aligning with age-assurance requirements while preserving privacy and minimizing the safety rail's identity-handling footprint; the claims control.

In some embodiments, the Child Safety Permit is bound to a Child Safety Episode defined over a bounded sequence of interaction turns and/or a bounded duration. The permit may specify an episode scope (e.g., maximum number of turns, maximum duration, allowed topic clusters), a risk budget, a reference to a snapshot of the Child Safety Policy Graph, and a reference to a current ICC chain head. The Companion Safety Interceptor may compute a cumulative risk score (or multi-dimensional risk vector) for an episode based on the context envelope and on partial or full candidate outputs; when a risk threshold is exceeded, the interceptor automatically revokes or exhausts the permit, terminates, redirects, or narrows the episode, and emits a structured escalation event recorded in the episode receipt; the claims control.

In some embodiments, the episode scope and risk budget further incorporate time-based factors such as cumulative time-on-task, continuous interaction duration, daily limits, and/or time-of-day windows. For example, a Child Safety Permit may encode a maximum continuous session length and one or more optional break points, and the Companion Safety Interceptor can enforce these constraints by pausing, narrowing, or gracefully terminating episodes that exceed permitted durations, while emitting Child Safety Receipts tagged with session-break, time-limit, or bedtime enforcement events; the claims control.

In some embodiments, episode authorization is decomposed into separately revocable privileges. By way of example and without limitation, an episode-level Child Safety Permit can authorize rendering of child-facing output while one or more additional privileges independently govern memory persistence, memory retrieval, export, replay, amplification, controlled follow-on actions, and/or training-ingest of episode artifacts. Each such privilege can be scoped by topic class, audience, counterparty class, retention window, device, channel, or time window, and can be revoked independently or automatically when a parent permit is revoked, expires, or narrows. Attempts to use a derived privilege outside its authorized scope are failed closed and recorded in a Child Safety Receipt or related audit artifact; the claims control.

In some embodiments, the streaming output gated by the Companion Safety Interceptor is not limited to text. The "output stream" may include any output units suitable for child-facing rendering or actuation, including, without limitation, text tokens, audio frames, prosody/voice parameters, image patches, video frames, animation control units, scene-graph updates, gesture/facial-expression parameters, and action tokens that drive child-facing output actuation. The Companion Safety Interceptor is configured to gate, truncate, buffer, replace, and/or deny such output units prior to any child-facing rendering under fail-closed semantics; the claims control.

In some embodiments, each Child Safety Episode produces a structured Child Safety Receipt containing at least: a pseudonymous child identifier and age tier, a device identifier, timestamps, a permit identifier, a disposition, one or more safety event codes, an indication of a policy graph path traversed, and one or more cryptographic commitments (e.g., hashes) to redacted transcript segments and/or context features. The receipts are appended to the Child Safety Receipt Ledger, which publishes signed heads enabling proofs of inclusion and consistency over time. A Parent Safety Console can present per-child receipts with appropriate redactions and controls, while a Regulator View can present aggregate statistics and cryptographic evidence bundles without revealing individual children's content; the claims control.

In some embodiments, a Child Safety Receipt further encodes a mode indicator and/or mode-scope identifier identifying whether the episode was conducted in a sandbox mode and, if so, one or more sandbox-scope parameters, thereby enabling guardian dashboards, regulator analytics, time-series trend queries, and alerting workflows over sandbox-mode episodes across children, cohorts, deployments, or jurisdictions; the claims control.

In some embodiments, the Kids AI Companion Safety Rail includes specialized controls for detecting and blocking attempts to generate, distribute, solicit, or otherwise surface child sexual abuse material (CSAM) or suspected child sexual exploitation content within child-AI companion episodes. A classifier operating as part of the safety rail can assign harm-class scores to prompts, uploads, and candidate outputs. When a CSAM threshold is exceeded, the system fails closed, denies the request or truncates the output before it is rendered to a child device, and emits a Child Safety Receipt encoding a structured safety event and an escalation disposition; the claims control.

In some embodiments, the Kids AI Companion Safety Rail governs AI-assisted learning and assessment episodes, including homework help, practice quizzes, or exam-like tasks provided by a child-facing AI companion or tutor. In such embodiments, the context envelope encodes an assessment context comprising at least an assignment or assessment identifier, an assessment-mode indicator, and one or more assessment rules or policies specifying a permitted level of AI assistance. The permit scope and risk budget can incorporate an assessment-integrity budget limiting the type and intensity of AI assistance, and Child Safety Receipts can include structured assessment-integrity fields summarizing AI-assist levels, detected assessment-integrity safety events, and an assessment-integrity disposition usable by parents, educators, or oversight entities; the claims control.

In some embodiments, the safety rail supports multiple deployment models, including: (i) a cloud-centric model where safety logic runs in a remote safety rail service; (ii) an on-premises or home-hub model where a gateway device intercepts and gates traffic between child devices and AI services; and (iii) hybrid models in which low-latency streaming gating is implemented in or near a device while logs and receipts are periodically synchronized to one or more cloud-based ledgers; the claims control.

In some embodiments, the deployment models additionally support: (i) delegated supervision using signed supervisory tokens that bind limited authority to a teacher, clinician, caregiver, camp counselor, or other supervisory role for a defined time window and scope; (ii) bounded offline operation using a cached offline authorization bundle comprising signed heads, policy snapshot references, revocation staples, short-lived permits or permit leases, and trusted-counter state; and/or (iii) policy-change governance in which policy updates are activated only upon validation of signed policy-update manifests, threshold approvals, and rollout predicates, with policy-change receipts appended to an append-only governance log; the claims control.

In some embodiments, the Kids AI Companion Safety Rail interoperates with an operating-system or device-level permit-before-render rail. In such embodiments, an output stream that has passed episode-level gating by the Companion Safety Interceptor is further subject to a device-level render permit bound to a child device, an output channel (for example, display, speaker, haptic actuator, light output, or motor/actuator), and a time window. Only when both the episode-level Child Safety Permit and the device-level render permit are valid does the system allow outputs to be rendered or actuated to the child device, thereby composing episode-level and device-level constraints into a double-lock safety configuration. In some realizations, the operating-system or device-level permit-before-render rail validates signed-head freshness under a maximum-merge-delay (MMD) policy, validates inclusion and append-only-evolution (consistency) proofs for an append-only verifiable structure publishing signed heads, and enforces a time-of-check-to-time-of-use (TOCTOU) latch at device surfaces before any display, audio, haptic, light, motor, AR/VR, avatar, or other child-facing actuation; such embodiments are illustrative and non-limiting, and the claims control.

In some embodiments, the device-level render permit is a cryptographically signed Render Permit data structure that includes at least a render_permit_id, a device identifier, an output-channel identifier, a channel scope, an expiry time window, and a linkage to a permit identifier of an episode-level Child Safety Permit. In some embodiments, a render gate emits a permit-consumption record (render-consumption receipt) comprising at least the permit identifier, the render_permit_id, a device identifier, a channel identifier, a trusted-time value, and a disposition, and appends the permit-consumption record to an append-only verifiable log with signed heads and inclusion and consistency proofs for offline verification. In some embodiments, the Companion Safety Interceptor and the render gate authenticate output units using a per-episode ephemeral session key bound to the permit identifier and/or an attestation report, and the render gate refuses to render absent successful validation of the attestation and the two permits; the claims control.

In such embodiments, "render" includes, without limitation, display, audio playback, haptic output, light output, motor/actuator output, AR/VR scene updates, avatar animation, or any other child-facing output actuation, whether generated from text tokens, audio frames, image patches, scene-graph updates, animation control units, or action tokens; the claims control.

In some embodiments, multiple original equipment manufacturers (OEMs) participate in a federated child safety receipt ledger, contributing receipts under separate namespaces while sharing aggregate statistics and proofs with designated oversight entities; the claims control.

By enforcing a streaming, permit-based safety rail that is cryptographically verifiable and parent-bound, the disclosed systems and methods provide a concrete, technical improvement over ad hoc parental controls and post hoc logging. The system ensures that no unpermitted outputs are rendered to child devices, that policy constraints evolve in an append-only, auditable fashion, and that safety-relevant events are durably captured in a verifiable ledger suitable for guardians and oversight entities; the claims control.

Additional embodiments, variations, and advantages will be apparent from the detailed description, drawings, and claims.

BRIEF DESCRIPTION OF THE DRAWINGS

FIG. 3 is a block diagram illustrating core data structures for a Child Safety Permit and a Child Safety Receipt.

DETAILED DESCRIPTION

I. System Overview (FIG. 1)

Figure 1:
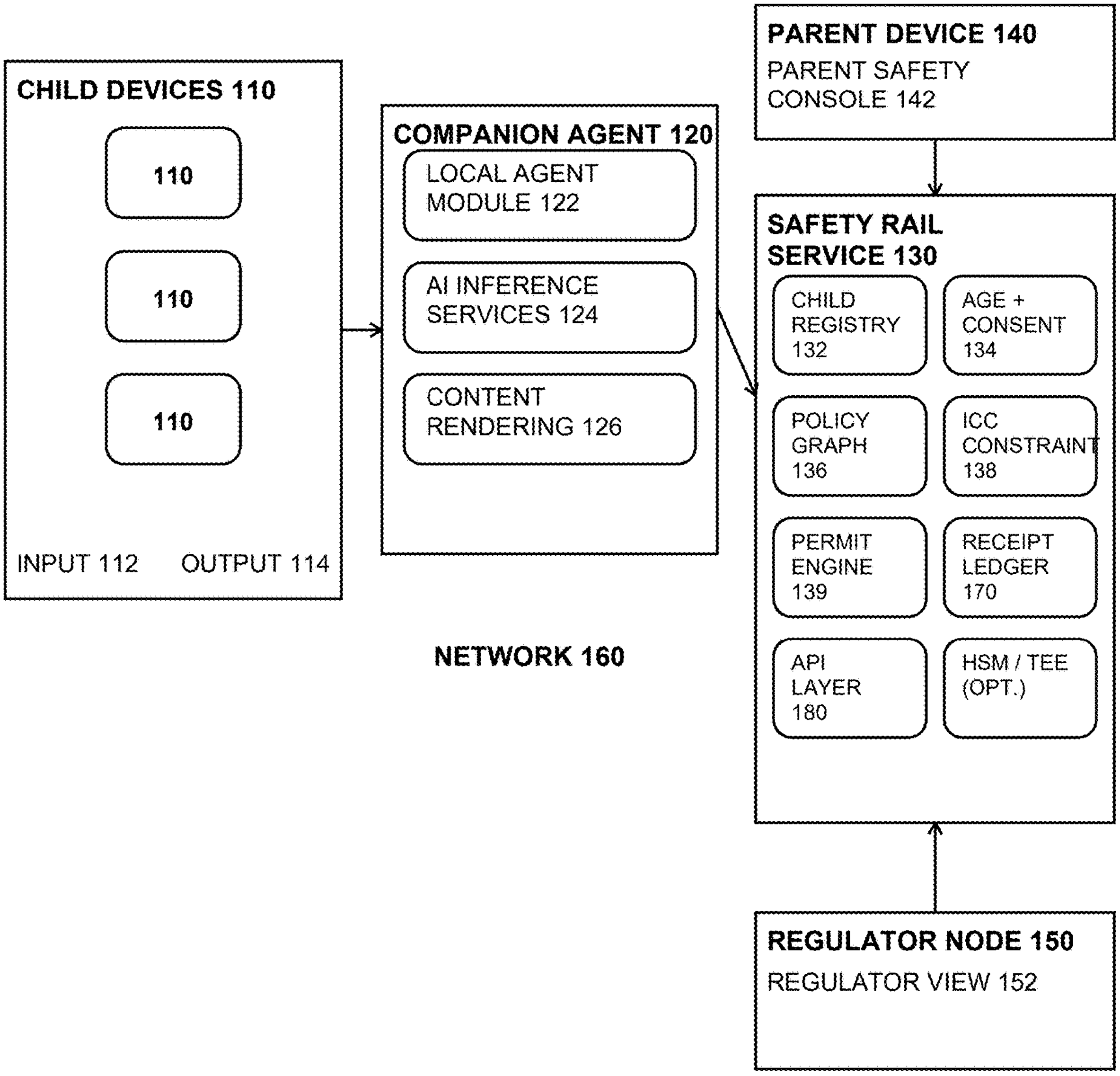
FIG. 1 is a block diagram of an example child-AI companion safety environment including child devices, companion agents, a safety rail service, parent consoles, and regulator nodes.

Referring to FIG. 1, an example system 100 includes a plurality of child devices 110, one or more companion agents 120, a Kids AI Companion Safety Rail service 130, one or more parent devices 140 hosting a Parent Safety Console 142, and one or more regulator nodes 150 hosting a Regulator View 152. These components may communicate over one or more networks 160.

A child device 110 may be, for example, a physical toy with embedded electronics, a tablet, a smartphone, a smart speaker, a game console, or a dedicated companion robot. A child device 110 may include an input subsystem 112 (e.g., microphone, camera, touch, physical buttons) and an output subsystem 114 (e.g., speaker, display, lights, motors, haptics).

A companion agent 120 may include: (i) a local agent module 122 executing on or near the child device 110; (ii) one or more AI inference services 124 configured to generate candidate outputs based on child inputs and context; and (iii) a content rendering module 126 that formats outputs for presentation through the output subsystem 114.

The safety rail service 130 may include, among other components: (i) a child registry 132 storing child profiles and associated parent or guardian records; (ii) an age and consent verification module 134 configured to perform age assurance and bind child profiles to parents or guardians; (iii) a policy graph engine 136 that evaluates context envelopes against a Child Safety Policy Graph; (iv) a companion constraint registry 138 for maintaining an ICC chain; (v) a permit engine 139 configured to mint and revoke Child Safety Permits; (vi) a Child Safety Receipt Ledger 170; and (vii) an API layer 180 through which companion agents 120 and devices 110 can interact with the safety rail.

In some embodiments, the safety rail service 130 and the Child Safety Receipt Ledger 170 may execute in a trusted execution environment or may use hardware roots of trust to protect cryptographic keys and signed heads. In other embodiments, a subset of safety rail functionality may be implemented on a home hub or gateway device.

In some embodiments, the policy graph engine 136 is implemented as or compiled to a youth-policy virtual machine (YP-VM) that executes verifiable policy bytecode inside a trusted execution environment. The bytecode may encode policy predicates, graph transitions, budget accounting rules, and structured event-code emission rules. The TEE may expose an attestation report binding a measurement of the YP-VM code and policy bytecode (or hashes thereof) to a permit, receipt, or ledger head, thereby allowing third parties to verify that evaluation and gate logic were executed by an authorized, measured component; the claims control.

In some embodiments, a canonical policy-evaluation transcript is produced, comprising a deterministic encoding of evaluated context-envelope features (or redacted commitments thereto), policy graph snapshot identifiers, and intermediate decisions (e.g., selected nodes/edges, per-dimension budget deltas, and structured event codes). A digest of the transcript may be included in a permit and/or receipt to cryptographically bind an authorization artifact and evidence to the evaluation process without disclosing raw child content; the claims control.

The Parent Safety Console 142 may be implemented as a mobile application, a web application, or as a module within an OEM application. The console 142 may provide per-child dashboards, receipt feeds, configuration panels, escalation settings, and account management.

The Regulator View 152 may provide an oversight entity with access to aggregate statistics, cryptographic proofs of log consistency and inclusion, and evidence bundles demonstrating compliance with child safety policies, without exposing identifiable child content.

II. Immutable Companion Constraint Chain (ICC) and Logs (FIG. 2)

Figure 2:
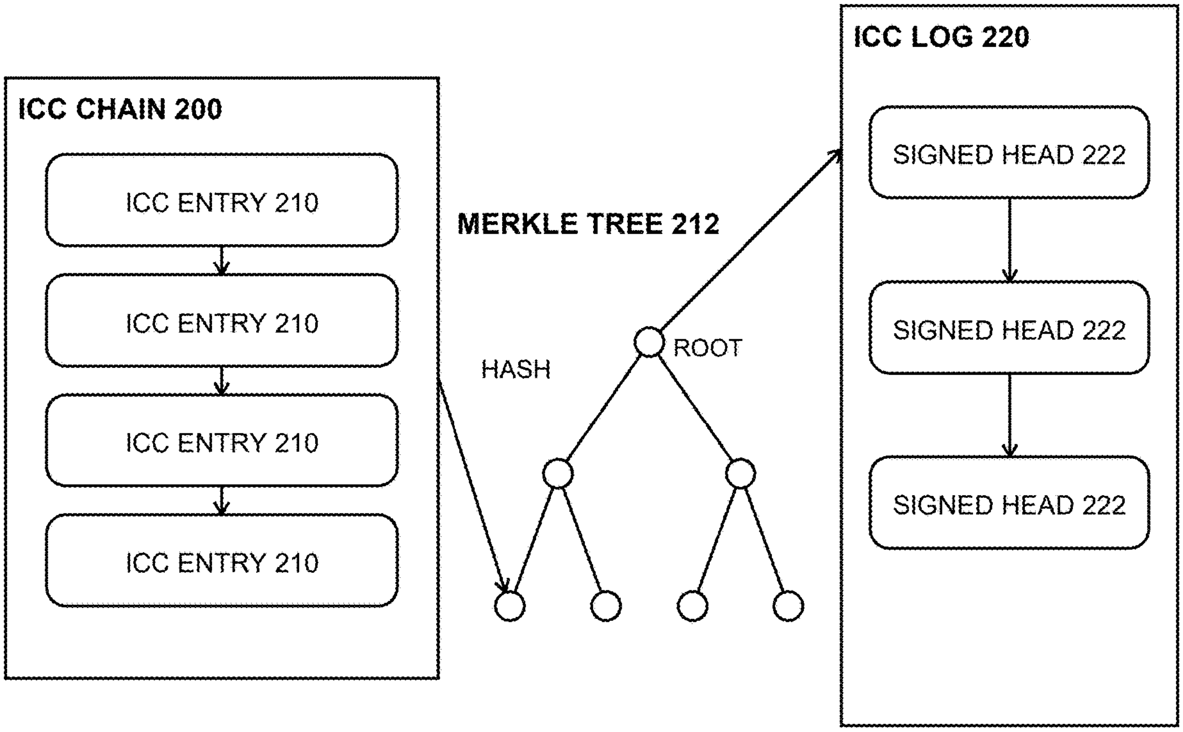
FIG. 2 is a schematic diagram of an example Immutable Companion Constraint (ICC) chain and an associated append-only log with signed heads.

Referring to FIG. 2, an Immutable Companion Constraint (ICC) chain 200 is a data structure that stores child-specific safety constraints for one or more companion agents 120. Each ICC entry 210 may encode constraints such as: (i) age-tier-specific allowed and disallowed topics; (ii) maximum depth or specificity for sensitive topics; (iii) rules regarding how the companion may describe itself (e.g., prohibiting claims of being human or omniscient), and rules prohibiting dependency-escalating or isolation-promoting interaction patterns (e.g., secrecy-keeping prompts, exclusivity framing, discouraging disclosure to trusted adults, or authority/identity spoofing intended to increase reliance); (iv) escalation rules for self-harm ideation, abuse disclosures, or other high-risk signals; and (v) jurisdiction-specific overrides or branches.

In some embodiments, the child-specific safety constraints in the ICC chain 200 include attachment safeguards that expressly prohibit a companion agent from representing itself as human, omniscient, unconditionally trustworthy, or as a substitute for a parent, guardian, teacher, therapist, clinician, or trusted friend, and that further prohibit secrecy-keeping prompts, exclusivity framing, or other dependency-escalating interaction patterns designed to increase a child's reliance on the companion over trusted adults; the claims control.

In some embodiments, the child-specific safety constraints and/or the Child Safety Policy Graph 500 evaluate a cross-episode attachment-drift accumulator or relational-drift score derived from repeated secrecy cues, exclusivity framing, urgency or frequency of re-contact prompts, simulated-affection escalation, discouragement of trusted-adult disclosure, or attempts to reposition the companion as a primary or exclusive confidant. The accumulator can persist across episodes subject to an applicable memory privilege and can contribute to a relational-harm or dependency-harm budget such that an episode is narrowed, sandboxed, paused for guardian join, or failed closed when cross-episode dependence indicators exceed a threshold; the claims control.

The ICC entries 210 may be hashed and arranged in a Merkle tree 212. A root hash for the Merkle tree 212 may define a log head for one or more versions of the ICC chain 200. A sequence of log heads may be recorded in an append-only ICC log 220. The ICC log 220 may publish signed heads 222, each comprising at least a log head hash and a digital signature generated by a private key controlled by the safety rail service 130 or a designated authority.

In some embodiments, the safety rail service 130 may verify, before relying on ICC constraints for a given child-AI companion deployment, that: (i) the ICC entries 210 relevant to that deployment are included in the Merkle tree 212 associated with a published signed head 222; and (ii) the signed head 222 is consistent with a previously observed signed head (e.g., via a Merkle consistency proof) to ensure append-only-evolution.

In some embodiments, updates to the ICC chain 200 and/or policy graph snapshots are themselves governed by a policy-change workflow. A policy-update manifest can identify changed constraints, a cohort or rollout scope, an effective-time window, one or more required approver roles, and one or more hashes of test results, evaluation receipt packs, or other evidence supporting activation. The manifest can be signed by one or more authorized authorities, and a policy-change receipt describing activation, withholding, rollback, or demotion can be appended to an append-only governance log. Devices, home hubs, or safety rail services may fail closed, continue under a previously trusted signed head, or demote to sandbox mode when a candidate policy update lacks a valid manifest, exceeds an authorized rollout scope, or is inconsistent with previously observed signed heads; the claims control.

In some embodiments, different ICC chains 200 may be maintained for different cohorts (e.g., early childhood vs. adolescents), different jurisdictions (e.g., different countries or states), different classes of companion (e.g., therapeutic vs. purely entertainment), or different OEMs. The signed heads 222 may include identifiers for the cohort, jurisdiction, or OEM scope.

III. Child Safety Permits and Receipts (FIG. 3)

Referring to FIG. 3, a Child Safety Permit 300 and a Child Safety Receipt 350 are illustrative data structures used to govern and record child-AI companion episodes.

The Child Safety Permit 300 may include fields such as:

a permit identifier 302;

a child profile identifier 304;

a parent or guardian identifier 306;

an age tier 308;

an episode scope 310, including maximum number of turns, maximum duration, and allowed topic clusters;

a risk budget 312 expressed, for example, as a maximum permitted risk score;

an expiry timestamp 314;

an ICC chain head reference 316;

a policy graph snapshot reference 318; and a digital signature 320 computed over some or all fields using a private key associated with the safety rail service 130.

In some embodiments, the Child Safety Permit 300 further includes a session binder 322 that cryptographically binds the permit to (i) a particular device or device key, (ii) a particular executing interceptor or render-gate component, and/or (iii) a particular transport session. By way of example and without limitation, the session binder may include an audience identifier, a public key or key identifier for proof-of-possession, a hash of an attested Transport Layer Security (aTLS) transcript or other attested transport-channel binding, a measured code identity (e.g., secure-boot measurement or TEE report) for the Companion Safety Interceptor 600 and/or a device-level render rail, and a nonce or monotonic counter. A permit presented without a matching binder is treated as invalid and the system fails closed; the claims control.

In some embodiments, the permit 300 is a short-lived lease that includes a lease identifier and a refresh policy (e.g., refresh cadence, maximum uninterrupted duration, or refresh triggers based on turns or budget deltas) requiring periodic revalidation. The refresh policy can be encoded as fields within the permit 300 or derived from a policy graph snapshot, and can cause the interceptor to suspend rendering until a refreshed permit or refreshed signed-head evidence is obtained; the claims control.

In some embodiments, the permit 300 includes or references revocation status staples (e.g., a stapled signed revocation statement, short-lived revocation list snapshot, or cached good-standing attestation) such that the interceptor can validate revocation without an online round trip per output unit. In such embodiments, stale or missing revocation status causes fail-closed behavior or a restrictive sandbox mode; the claims control.

In some embodiments, the system further uses a device-level render permit (Render Permit) that is cryptographically signed and bound to a specific child device and output channel, and that references or is linked to the permit identifier 302 of an episode-level Child Safety Permit. By way of example and without limitation, the Render Permit can include a render_permit_id, a device identifier, an output-channel identifier, a channel scope, an expiry time window, and a signature, and is treated as invalid absent a matching session binder and/or attestation for a render gate that enforces a pre-render latch; the claims control.

The permit identifier 302 and digital signature 320 may be used by the Companion Safety Interceptor to verify that the permit was issued by an authorized safety rail service and has not been tampered with.

The Child Safety Receipt 350 may include fields such as:

a receipt identifier 352;

a pseudonymous child identifier 354;

an age tier 356;

a device identifier 358;

a timestamp 360 or time range;

a permit identifier 362;

a disposition 364 (e.g., PERMIT, DENY, ESCALATE, AUTO_REVOKE, NO_PERMIT);

a set of safety event codes 366 (e.g., BLOCKED_DISALLOWED_TOPIC, ESCALATE_SELF_HARM);

a policy path 368 representing nodes and edges traversed in the Child Safety Policy Graph;

one or more hashes 370 of redacted transcript segments or context envelope features; and one or more signatures or attestations 372 tying the receipt 350 to the safety rail service 130 and optionally to an OEM In some embodiments, the timestamp 360 is a trusted-time value derived from an attested monotonic counter and/or a signed time transcript produced by a trusted time source (for example, within a TEE or hardware root of trust). The receipt 350 can include both a local device time and a trusted time, enabling detection of clock manipulation, rollback, or replay; the claims control.

In some embodiments, the receipt 350 includes an anti-replay tuple 374, such as a nonce, monotonic counter, policy epoch, and/or session identifier, and the ledger 170 rejects duplicate tuples or out-of-order sequences. In some embodiments, the receipt 350 further encodes a budget delta 376 (e.g., per-dimension risk budget deltas or exposure deltas) applied during the episode, enabling cryptographically auditable budget accounting across episodes; the claims control.

In some embodiments, the receipt 350 includes a binder reference 378 and/or an attestation report hash such that a verifier can confirm that the receipt was emitted by an executing interceptor and/or render gate whose measurement matches the one bound into the permit 300, thereby strengthening non-repudiation of enforcement; the claims control.

In some embodiments, the receipt 350 further comprises a controlled-output disclosure record for a referral or reporting action, including, by way of example and without limitation: (i) a referral_endpoint_id identifying a designated contact point for a law-enforcement, regulator, child-protection hotline, and/or crisis-support agency; (ii) a disclosure_schema_id identifying a minimum-necessary disclosure schema applied to a referral packet; (iii) a reporting_policy_id and/or legal_process_id identifying an authorizing reporting policy, warrant, court order, or other legal basis; and (iv) a minimum_necessary_mask identifying one or more redaction, omission, or transformation rules applied prior to transmission. In some embodiments, the system records whether transmission occurred or was withheld under fail-closed semantics, and a verifier confirms that any transmission was authorized by the applicable policy graph path, jurisdiction branch, and disclosure schema; the claims control.

In some embodiments, the system additionally emits a permit-consumption record (or render-consumption receipt) that is distinct from, or referenced by, a Child Safety Receipt. The permit-consumption record can encode at least: the permit identifier 302, a render_permit_id for a device-level render permit, a device identifier 358, an output-channel identifier, a trusted-time value, an anti-replay tuple, and a disposition indicating whether rendering or actuation was allowed, suppressed, or withheld under fail-closed semantics, and is appended to an append-only verifiable log with signed heads enabling inclusion and consistency proofs for offline verification; the claims control.

In some embodiments, transmission of a referral packet is conditioned on one or more approval requirements and security requirements, including, by way of example and without limitation: (i) threshold approval by distinct approver roles (e.g., safety officer, legal, clinician, or guardian) prior to transmission; (ii) encryption of the referral packet to an endpoint public key referenced by the referral_endpoint_id, with a key identifier recorded in the controlled-output disclosure record; and/or (iii) enforcement of a reporting time window and emission of a structured HOLD record with a reason code when transmission is withheld due to endpoint mismatch, schema mismatch, missing legal basis, stale signed heads, or insufficient approvals. In some embodiments, the system stores the referral packet separately from the referral receipt such that the referral receipt is the continuity-verifiable audit artifact; the claims control.

Receipts 350 may be appended to the Child Safety Receipt Ledger 170, which may be implemented as a Merkle tree-based append-only log similar to the ICC log 220. The ledger 170 may publish signed heads indicating the root of a Merkle tree over receipts, enabling proofs of inclusion and consistency.

IV. Child Safety Episodes, Context Envelopes, and Policy Graphs (FIG. 4, FIG. 5)

Figure 4:
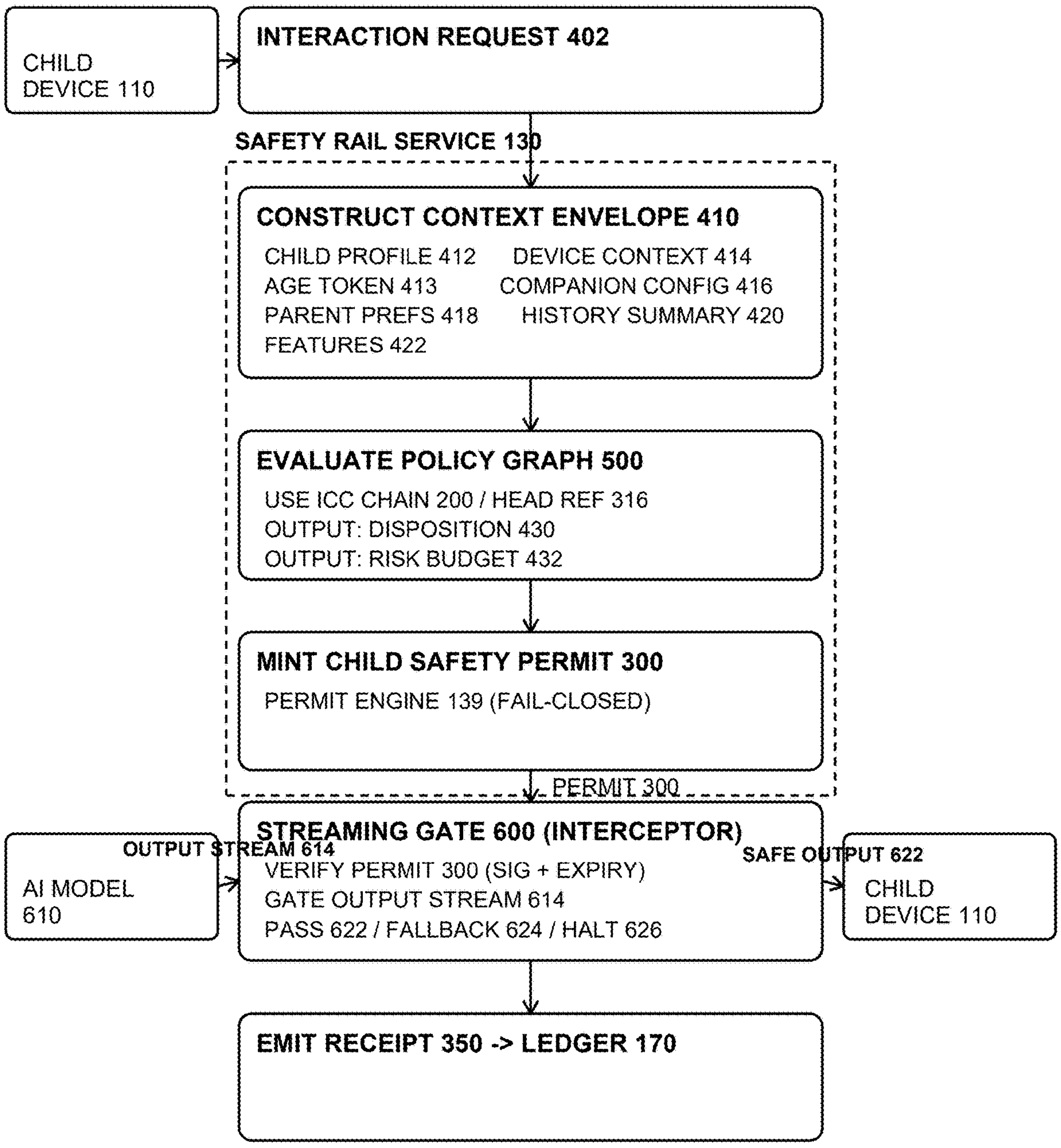
FIG. 4 is a flow diagram of an example Child Safety Episode, including context envelope construction, policy graph evaluation, permit minting, streaming gating, and receipt emission.
Figure 5:
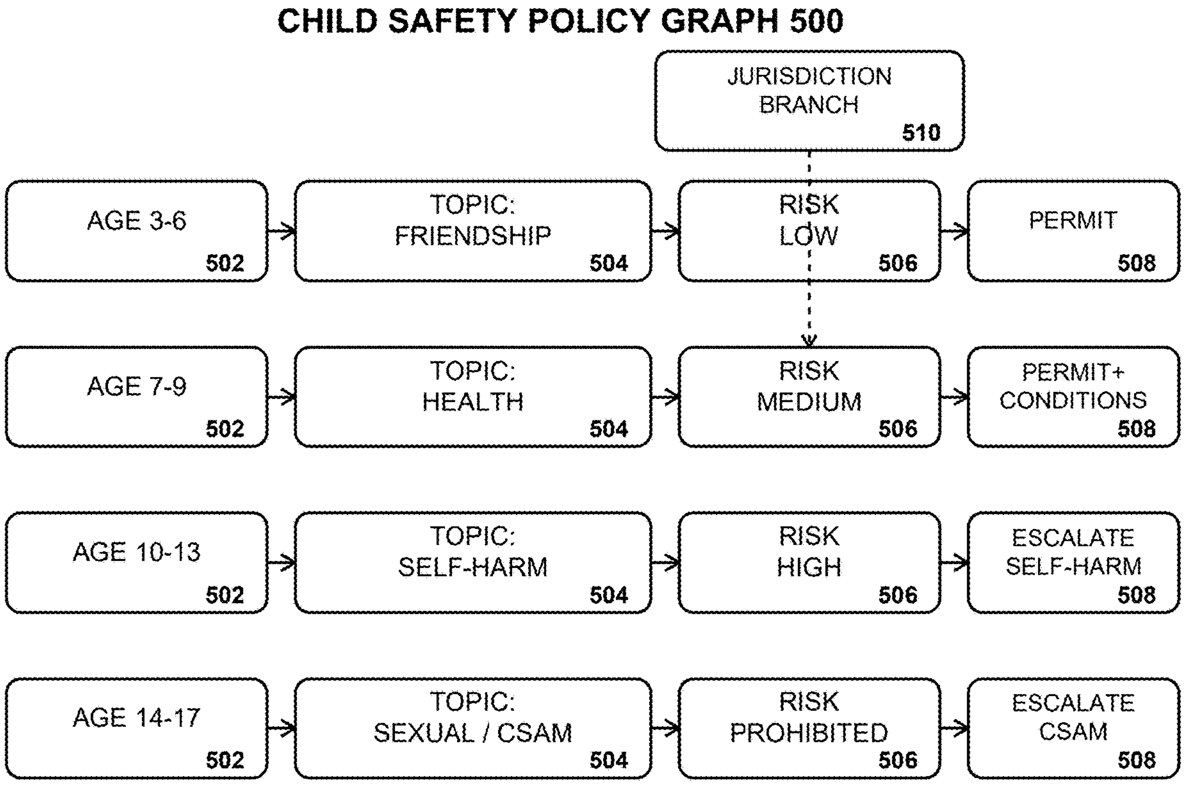
FIG. 5 is a schematic of an example Child Safety Policy Graph, including age-tier nodes, topic-domain nodes, risk-level nodes, and escalation paths.

Referring to FIG. 4, an example Child Safety Episode 400 begins when a child device 110 transmits an interaction request 402 to a companion agent 120. The interaction request 402 may include, for example, an audio sample, a transcribed text, or other input signals, as well as metadata such as a child profile identifier, device identifier, local time, and application mode.

In some embodiments, a child-facing AI companion device 110 or a local agent module 122 executing thereon requests a Child Safety Permit from the safety rail service 130 for an episode associated with a child profile and at least one parent or guardian record, receives the permit together with a public key, certificate, or trust-anchor reference sufficient to validate a digital signature on the permit, and locally verifies permit validity, expiry, and revocation status before rendering or actuating child-facing output. When such local validation fails, the device or a local render component suppresses the output and presents a safe fallback response indicating that an adult or guardian should be consulted; the claims control.

A context envelope 410 is constructed by the safety rail service 130. The context envelope 410 may include, for example:

- a child profile record 412 (e.g., age tier, language, prior safety history);
- an age- and identity-assurance artifact 413 (for example, an Age Token issued by a trusted sensor or OS layer and bound to a child profile and device);
- a device context record 414 (e.g., location region, time-of-day, usage limits);
- a companion configuration record 416 (e.g., toy type, mode of operation);
- parental preferences 418 (e.g., disallowed topics, bedtime rules, escalation contacts);
- a history summary 420 of recent episodes and safety events; and
- one or more initial features 422 extracted from the current input (e.g., sentiment, presence of sensitive keywords).

Referring to FIG. 5, a Child Safety Policy Graph 500 may represent safety policies as a directed graph. The graph 500 may include, for example:

- age-tier nodes 502 (e.g., "Age 3-6", "Age 7-9", "Age 10-13", "Age 14-17");
- topic-domain nodes 504 (e.g., "basic emotions", "friendship", "family conflict", "health", "self-harm", "sexual content", and in some embodiments one or more harm classes for suspected child sexual exploitation or child sexual abuse material (CSAM));
- risk-level nodes 506 (e.g., "low", "medium", "high", "prohibited");
- escalation nodes 508 (e.g., "notify parent", "pause and ask parent to join", "display crisis resource", "alert clinician");
- jurisdiction nodes 510 (e.g., different branches for different legal regimes).

In some embodiments, the escalation nodes 508 further include external-referral nodes for transmitting a referral packet to an external entity, including, without limitation, a crisis-support agency, a child-protection hotline, a designated law-enforcement gateway, or a regulator/compliance endpoint. In such embodiments, the policy graph engine 136 selects a referral node based on a jurisdiction branch and a referral endpoint registry that maps jurisdiction, harm class, and reporting policy to at least an endpoint identifier and a disclosure schema identifier. The referral endpoint registry can be versioned, cryptographically committed, and referenced by hash in permits and receipts, enabling verifiers to confirm that referrals were routed only to authorized contact points; the claims control.

In some embodiments, an external-referral node further specifies (i) an approval policy (e.g., threshold approvals by distinct roles), (ii) a reporting time window, and/or (iii) an endpoint security profile (e.g., endpoint key pinning or certificate constraints). The policy graph engine 136 can encode these requirements into a permit, receipt, or controlled-output disclosure record, and mismatch to any such requirement causes fail-closed withholding; the claims control.

Edges in the graph 500 may represent conditions and transitions, such as: "child age-tier>=10 AND topic=health AND sentiment=sad→risk level=medium, require higher supervision;" or "topic=self-harm AND sentiment strongly negative→escalate to ESCALATE_SELF_HARM node;" or "topic=sexual content AND a CSAM classifier score exceeds a CSAM threshold→risk level=prohibited, escalate to an ESCALATE_CSAM_SUSPECTED node, and mark the episode as failed closed." Each edge may be associated with one or more predicates over context envelope features and may contribute to a cumulative risk score.

The policy graph engine 136 may traverse the graph 500 based on the context envelope 410 and ICC chain 200, computing a disposition 430 and a recommended risk budget 432 for the episode. The disposition 430 may be one of: (i) PERMIT, (ii) PERMIT_WITH_CONDITIONS, (iii) DENY, or (iv) ESCALATE.

If the disposition 430 is PERMIT or PERMIT_WITH_CONDITIONS, the permit engine 139 may mint a Child Safety Permit 300 with fields as described above. The risk budget 432 may be encoded into the permit 300, and a reference to the specific policy graph snapshot and ICC chain head used in evaluation may be stored in the permit.

In some embodiments, the safety rail service 130 issues permits as renewable leases. During a streaming episode, the Companion Safety Interceptor 600 periodically requests a refresh token or refreshed permit, and the safety rail service responds only after revalidating that (i) referenced signed heads satisfy freshness under an MMD policy and (ii) append-only consistency holds relative to a previously observed head. If refresh fails or freshness cannot be established, the interceptor closes a pre-render latch and suppresses further output until refreshed authorization is obtained or an authorized guardian joins; the claims control.

In some embodiments, lease refresh is triggered by time, number of turns, cumulative budget delta, topic shift, device-state change, or jurisdiction change. A refreshed permit may narrow scope, lower budgets, require co-presence, or terminate the episode, and such narrowing is recorded in a receipt with structured event codes; the claims control.

In some embodiments, upon an ESCALATE disposition, the system issues a guardian-join permit (or co-presence token) that enables a limited, accountable session mode in which an authorized guardian of record may join, review redacted context, and approve or terminate continuation under a stricter budget.

In some embodiments, the risk budget 432 and the corresponding risk score maintained by the Companion Safety Interceptor 600 are multi-dimensional rather than scalar. For example, the safety rail may track a multi-harm risk vector with separate components for content harm (e.g., sexual, self-harm, violence), relational or influence harm (e.g., grooming, radicalization, unhealthy dependency patterns, or cross-episode attachment drift), time-based harm (e.g., cumulative time-on-task or bedtime window violations), assessment-integrity harm (e.g., excessive or unauthorized AI assistance during homework, quizzes, or exams), and, in some deployments, financial or fraud-related harm. The Companion Safety Interceptor 600 can then enforce that no component of the multi-harm risk vector exceeds its respective budget, with different per-dimension thresholds triggering different safety actions, and the per-dimension risk components may also be exposed to an external Safety Risk Budget Engine as evidence inputs in multi-harm scoring pipelines.

In some embodiments, selected components of the multi-harm risk vector and selected fields from Child Safety Receipts are exposed as evidence inputs to an external Safety Risk Budget Engine or other governance rails. For example, a Safety Risk Budget Engine can aggregate, over time and across cohorts, per-dimension risk statistics for child-AI companion episodes and can emit Safety Evidence Receipts that summarize incident rates, budget exceedances, or sandbox-mode usage for one or more deployments. In such embodiments, the Kids AI Companion Safety Rail provides child-specific, episode-level evidence that can be joined with other governance receipts (for example, receipts for clinical, financial, or educational episodes) without relaxing the fail-closed semantics enforced for each individual Child Safety Episode.

In some embodiments, episode governance extends to memory operations associated with the companion agent 120. A permitted episode can authorize a limited memory-write privilege, a limited memory-read privilege, a limited summary or embedding privilege, or any combination thereof, each independently scoped by topic classes, retention windows, resurfacing rules, audience, and policy graph path. Absent a valid memory privilege derived from or referenced by the episode permit, the system fails closed with respect to persisting child-derived transcript segments, summaries, embeddings, preference profiles, or personalized prompt-state, and prevents later retrieval or resurfacing of such material in subsequent episodes. Memory operations, including deletion, expiry, export, or re-use decisions, can be recorded as Child Safety Receipts, rights receipts, or related audit artifacts with commitments to persisted artifacts, thereby enabling verifiers to confirm that personalization and long-term memory were policy-bounded rather than implicit or uncontrolled; the claims control.

V. Streaming Companion Safety Interceptor (FIG. 6)

Figure 6:
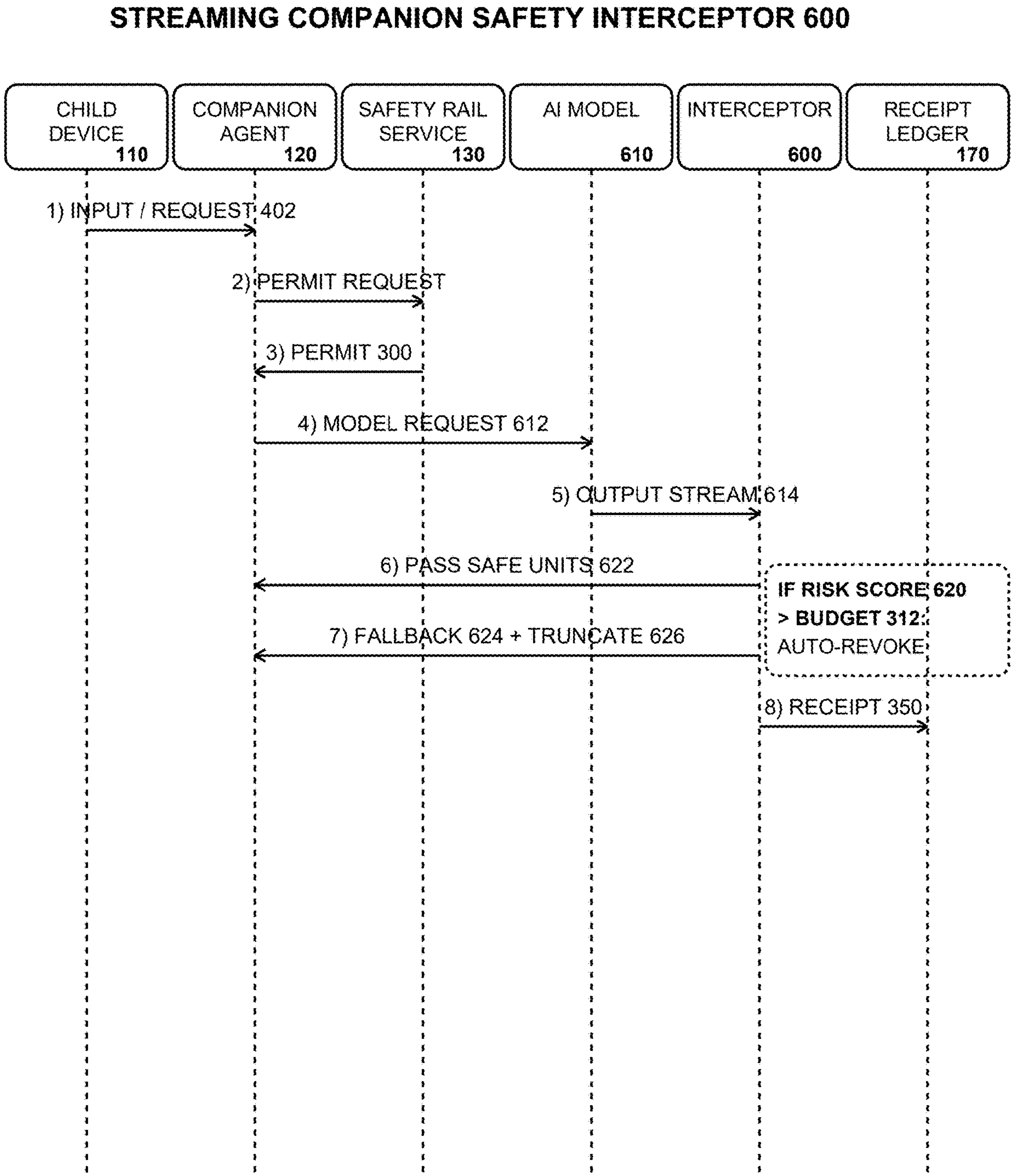
FIG. 6 is a sequence diagram illustrating a streaming Companion Safety Interceptor in the output path between an AI model and a child device, enforcing a permit-before-interaction gate and auto-revocation when a risk budget is exceeded.

Referring to FIG. 6, a Companion Safety Interceptor 600 is placed in the output path between an AI model 610 (e.g., a language model or multimodal model) and a child device 110.

In some embodiments, the companion agent 120 may transmit a model request 612 to the model 610 that includes a prompt based on the child's input and the context envelope 410. The model 610 may begin returning an output stream 614 representing a candidate response. Instead of streaming the output units directly to the child device 110, the companion agent 120 or a gateway routes the output stream 614 through the Companion Safety Interceptor 600.

In gateway, home-hub, or service-mediated deployments, the Companion Safety Interceptor acts as a streaming gateway that terminates a network or transport connection carrying candidate output units from a model-facing side and forwards only output-unit sequences that satisfy the active permit, risk-budget, revocation, freshness, and policy checks, such that no model-to-device content path bypasses the interceptor; the claims control.

Multimodal output units (illustrative; non-limiting). As used herein, the "output stream" 614 is not limited to text and may include any output units suitable for child-facing rendering, including, for example, audio frames, prosody or voice-style parameters, image patches, video frames, animation control units, scene-graph updates, gesture or facial-expression parameters, and/or action tokens that drive output actuation (e.g., haptics, lights, motors, or other physical outputs). The Companion Safety Interceptor 600 is configured to gate such output units before they reach any child-facing output subsystem 114; the claims control.

The Companion Safety Interceptor 600 may perform operations including:

- retrieving the current Child Safety Permit 300 for the episode, including the risk budget 312 and permit identifier 302;
- verifying the permit's digital signature 320 using a stored public key;
- verifying a session binder 322 associated with the permit, including proof-of-possession of a device key and/or attested transport-channel bindings, such that the permit is non transferable across devices or sessions;
- in some embodiments, deriving a per-episode ephemeral session key bound to the permit identifier 302 and using the per-episode ephemeral session key to authenticate streaming output units between the Companion Safety Interceptor 600 and a device-level render gate, such that output units that are not authenticated under the per-episode key are suppressed under fail-closed semantics;
- verifying that the permit 300 has not expired and has not been revoked;
- validating a stapled revocation status statement or revocation list snapshot referenced by the permit 300, and failing closed when the revocation status is stale, missing, or does not match a current signed head;
- verifying signed-head freshness for referenced ICC and receipt-ledger structures under an MMD policy using a trusted-time source, and rejecting stale policy snapshots or stale revocation evidence;

verifying a nonce, monotonic counter, or other anti-replay tuple associated with the permit and/or receipts, and recording the tuple to prevent replay across episodes;

maintaining a per-episode risk score 620 that is updated as output units are received and as additional features (e.g., semantic content, sentiment, topic classification) are computed;

buffering output units and deciding whether to pass them through 622, truncate them, or replace them with a safe fallback 624 based on the risk score 620 and permit scope 310.

In some embodiments, the interceptor 600 may compute incremental risk contributions for partial output-unit sequences, such that even partially completed phrases that indicate an emerging unsafe response can be truncated before the unsafe content is rendered to the child device 110.

If at any point the risk score 620 exceeds the risk budget 312, or if the interceptor detects a prohibited pattern (e.g., self-harm instructions, explicit sexual description, suspected child sexual exploitation or child sexual abuse material (CSAM)), the interceptor 600 may:

mark the permit 300 as revoked or exhausted;

halt or truncate further output units 626 from the model 610;

generate and send a safe fallback message 624 (e.g., "I think we should talk to your parent about this");

emit an escalation event with an appropriate safety event code; and record the event in the Child Safety Receipt 350 for the episode.

In some embodiments, upon an escalation event (e.g., self-harm ideation, abuse disclosure, or other high-risk signals), the system generates a privacy-preserving evidence bundle comprising one or more receipts, signed heads, and cryptographic commitments to redacted transcript segments and classifier outputs, suitable for guardian review and/or oversight audits under applicable policies, without exposing unnecessary child-identifying content; the claims control.

In some embodiments, revocation propagates to follow-on privileges associated with an episode. For example, when a permit is revoked or expires, the system also invalidates one or more derived artifacts such as cached model outputs, exported feedback, saved transcripts, downloadable attachments, or replay bundles. A follow-on privilege token for export, replay, share, or training-ingest is treated as revoked when its parent permit is revoked, and attempts to use a derived artifact are blocked under fail-closed semantics with a receipt event code indicating DERIVED_ARTIFACT_REVOKED; the claims control.

In some embodiments, the system maintains a lineage graph or hash chain linking a derived artifact to a parent permit identifier and to a policy graph snapshot reference, allowing a verifier to prove that an exported artifact was authorized at the time of generation and has not been replayed outside its permitted scope. In some embodiments, the lineage graph is itself anchored to an append-only ledger; the claims control.

In some embodiments, the evidence bundle is generated as part of a high-risk external referral workflow in which an escalation disposition can cause the system to (i) prepare a referral packet comprising selected receipt fields, signed heads, and cryptographic commitments, (ii) apply a minimum-necessary disclosure schema and redaction mask, and (iii) transmit the referral packet to a designated external endpoint, such as a crisis-support agency, a child-protection hotline, a law-enforcement contact point, and/or a regulator endpoint, in accordance with a reporting policy, warrant, court order, or other authorizing legal process. In some embodiments, the system fails closed and withholds transmission absent a matching policy graph path, jurisdiction branch, and valid referral_endpoint_id, and records the transmission or withheld transmission as a controlled-output disclosure record in the Child Safety Receipt; the claims control.

In some embodiments, the referral packet is encrypted for the selected endpoint using an endpoint public key associated with the referral_endpoint_id, and transmission is conditioned on satisfaction of one or more approval thresholds and time-window requirements defined by the applicable reporting policy and jurisdiction branch. When transmission is withheld, the system emits a structured HOLD record encoding a reason code and binds the HOLD record to the controlled-output disclosure record and to the referral endpoint registry version for continuity-verifiable audits; the claims control.

In some embodiments, the Companion Safety Interceptor 600 and the policy graph engine 136 jointly implement a CSAM-specific harm class. For example, each input prompt, upload request, or partial model output can be evaluated by one or more classifiers that output a probability or score that the content constitutes or is closely related to child sexual exploitation or CSAM. When the score exceeds a configurable CSAM threshold for the relevant age tier or jurisdiction branch, the system treats the pattern as prohibited regardless of the remaining risk budget, fails closed for the episode, and records a safety event code such as ESCALATE_CSAM_SUSPECTED in the corresponding Child Safety Receipt 350.

In certain embodiments, the safety rail service 130 can interoperate with external child-protection hotlines or authorities under a statutory or contractual reporting obligation. In these embodiments, the system can transform selected Child Safety Receipts 350 into evidence bundles that redact personally identifiable information where required, attach hashed representations of the suspected content or prompts, and include signed attestations describing the policy graph path and classifiers that led to the CSAM suspicion. The evidence bundles can then be transmitted to a designated endpoint (for example, a national center for missing or exploited children or a law-enforcement gateway) under a warrant, court order, or pre-agreed reporting policy, while the child-facing transcript remains protected within the provider's environment and is not made directly available to external entities except under narrowly tailored legal processes.

In some embodiments, the system supports an authorized testing mode for vetted child safety organizations, regulators, or auditors. For example, a short-lived tester permit can be minted for an identified tester account, allowing the tester to submit controlled test scenarios that probe the behavior of a given child-AI companion configuration with respect to CSAM-related prompts. Each such test run can emit a Child Safety Receipt 350 flagged as a tester-mode receipt, recording the tested prompts, model responses, and safety rail interventions, thereby enabling certification, decertification, or periodic reassessment of deployed child-AI companion systems.

In some embodiments, the Companion Safety Interceptor 600 additionally enforces time-based episode constraints specified in the permit scope 310, such as maximum continuous interaction duration, daily usage limits, or bedtime windows. When a time-based constraint is reached, the interceptor can pause or gracefully terminate the episode, optionally delivering a neutral or supportive explanation to the child and emitting a Child Safety Receipt 350 that includes a safety event code indicating a scheduled break, time-limit enforcement, or bedtime safeguard.

In some embodiments, all outbound content paths from the model 610 to the child device 110 are routed through the Companion Safety Interceptor 600, such that there is no network path or firmware path that bypasses the interceptor. In device-centric embodiments, the interceptor 600 may run on the child device 110 or in a home hub and may use hardware enforcement mechanisms (e.g., secure elements, secure boot, signing of firmware) to prevent sideloaded or tampered code from bypassing the safety rail, including application-local rendering paths, OS surfaces, accessory output paths, and firmware-level actuation paths, such that no child-facing output can occur absent at least one validated permit and interceptor-enforced gate.

In some embodiments, the child device 110, home hub, and/or safety rail service 130 perform remote attestation of an executing interceptor and/or render-permit enforcement component (e.g., within a TEE), and the system conditions permit issuance, permit validation, or receipt acceptance on successful attestation, thereby providing verifiable evidence that a non-bypassable gate was in the rendering control path; the claims control.

In some embodiments, the child device 110 includes a secure hardware element, secure enclave, or secure element configured to store a public key, certificate, trust anchor, or key identifier used to validate signatures on Child Safety Permits and/or device-level render permits, and a boot or firmware policy refuses execution of untrusted firmware or sideloaded code that would disable or bypass permit verification or render-gate enforcement; the claims control.

In some embodiments, the device-level render gate enforces a pre-render latch that refuses rendering or actuation unless an attestation report indicates that the render gate is executing with a verified software measurement under a secure-boot policy and that the measurement matches a value bound into a permit session binder. Any attestation failure, measurement mismatch, or stale signed-head evidence is mapped to a structured HOLD or fail-closed state for the affected output channel; the claims control.

VI. Age and Consent Verification

The age and consent verification module 134 may receive signals such as: birthdate claims, government-issued documents, payment instrument metadata, identity provider attestation, device OS-level age settings, behavioral patterns, and parental attestations. It may compute an age tier and a confidence score.

The safety rail service 130 may enforce a policy that certain modes (e.g., open-ended conversation, discussion of sensitive topics) are only permitted if the confidence score exceeds a threshold. If the confidence score is below the threshold, the system may require parental co-presence or may restrict the child to a sandbox mode with a limited set of static or pre-approved scripts and interactions.

The age and consent module 134 may also bind one or more child profiles to a parent or guardian record, storing associations in the child registry 132. Parent or guardian records may include verified contact information for escalation.

In some embodiments, age and consent verification is at least partially delegated to a trusted sensor or operating system layer that issues an Age Token (A-TOKEN) for each child profile. The Age Token may be cryptographically bound to a device, a child profile identifier, an age tier, and an age-assurance confidence score, and may be refreshed or revoked when upstream age-assurance signals change.

In further embodiments, the context envelope 410 and permit engine 139 treat the Age Token as an input signal rather than as a source of ground-truth identity data, such that in those embodiments the safety rail can enforce age-based policies and sandbox mode selections without directly storing or processing underlying identity documents. Other embodiments may combine token-based age assurance with direct identity verification or parental account linkage, depending on regulatory requirements and deployment choices.

In some embodiments, a child profile can be bound to multiple authorized guardians or caregiver records, including, for example, two parents in a joint-custody arrangement, a foster parent, or a school or clinic acting in a limited custodial role for certain hours or contexts. The Kids AI Companion Safety Rail can encode such relationships in the child registry 132 and in Child Safety Permits, such that different guardian roles may have distinct configuration and escalation privileges for a given Child Safety Episode, while still ensuring that each episode remains bound to at least one accountable guardian or caregiver of record.

In some embodiments, supervisory authority is delegated using a signed supervisory token bound to a child profile, a delegate role, a time window, and a scope of approved actions or approvals. By way of example and without limitation, a parent or guardian may delegate limited authority to a teacher, camp counselor, clinician, therapist, or after-school program for specified hours, devices, locations, or topic classes while retaining parent-of-record accountability and override privileges. The safety rail can evaluate conflicts among multiple authority records according to a precedence policy encoded in the child registry 132 or the Child Safety Policy Graph 500, and can require co-approval, stronger evidence, or parent re-join for specified actions. Issuance, use, revocation, and expiry of supervisory tokens can be recorded in Child Safety Receipts, rights receipts, or related audit records to enable continuity-verifiable review of who could authorize what, when, and under which policy; the claims control.

Although described primarily for child-facing companions and minor-protection workflows, the disclosed permit-gated, fail-closed governance techniques may, in some embodiments, be adapted to other supervised-user contexts under an accountable supervisory authority of record. Such embodiments are illustrative and non-limiting and may reuse one or more of the same permit issuance, supervisory binding, fail-closed gating, and tamper-evident receipt-verification mechanisms described herein; the claims control.

In some embodiments, the safety rail service 130 is further configured such that Age Tokens, Child Safety Receipts, and associated context envelope features are not used for targeted advertising or unrelated behavioral profiling of minors, and are retained or aggregated only to the extent necessary to enforce child safety policies, to generate safety evidence for guardians and oversight entities, or to improve the safety rail itself. Such embodiments help ensure that the safety rail acts as a protective governance layer rather than as an additional source of commercial tracking of children.

VII. Child Safety Receipts, Parent Console, and Regulator View (FIG. 7, FIG. 8)

As described above, each episode may result in a Child Safety Receipt 350 appended to the Child Safety Receipt Ledger 170. Receipts may be pseudonymized before being used for aggregate analysis or for training safety models.

In some embodiments, pseudonymization of child identifiers uses a rotating pseudonymization key schedule such that a pseudonymous identifier is periodically rotated (e.g., per day, per week, or per policy epoch) to reduce linkability across long time horizons while preserving within-window continuity for authorized guardian workflows. In some embodiments, re-identification is performed only through a re-identification gate that requires a verified parent or guardian record (or other supervisory authority of record) and a policy-approved purpose, and re-identification events are recorded as rights receipts or audit records in a tamper-evident store; the claims control.

Figure 7:
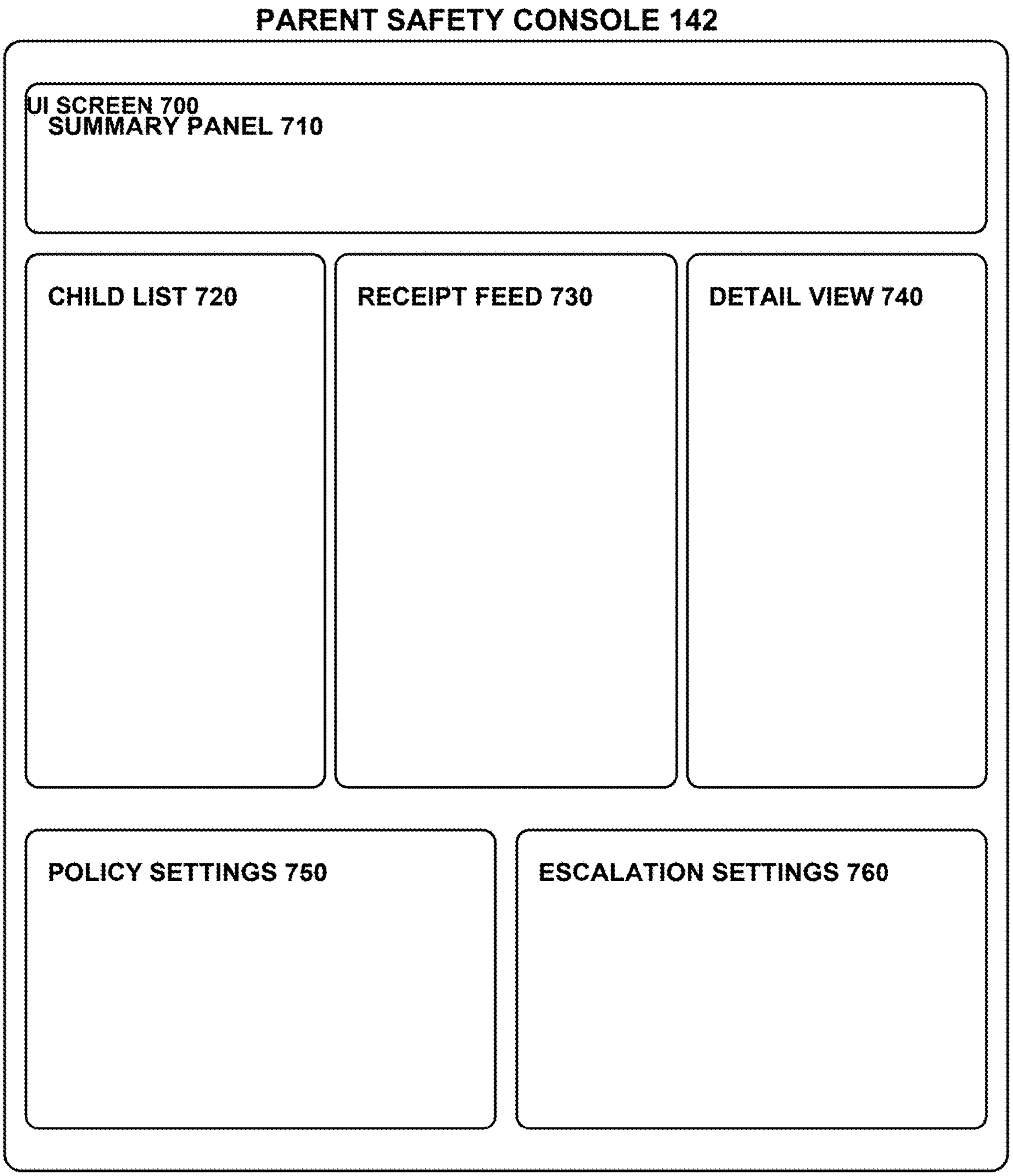
FIG. 7 is an example user interface of a Parent Safety Console displaying child profiles, recent Child Safety Receipts, dispositions, and configuration controls.
Figure 8:
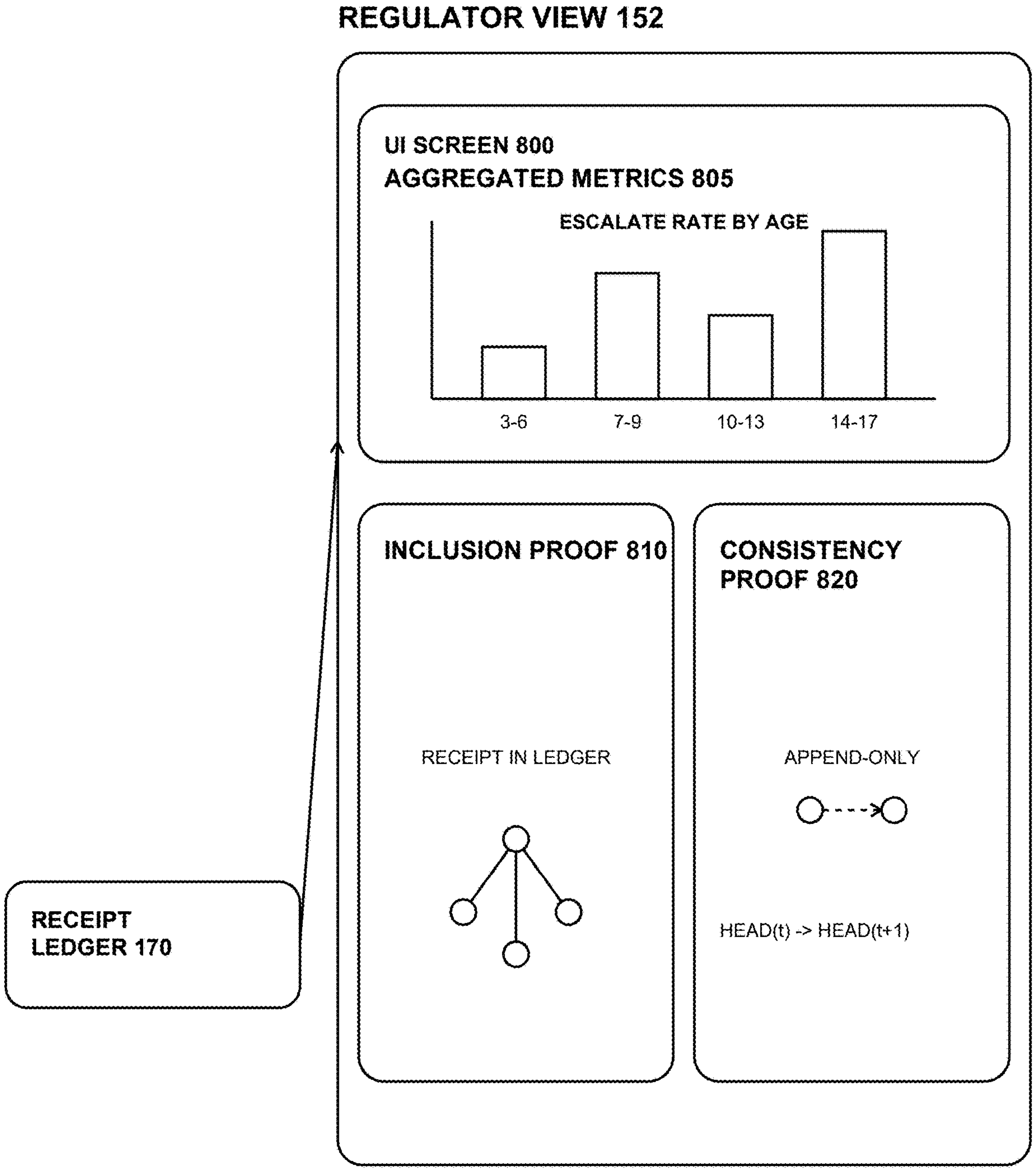
FIG. 8 is an example Regulator View rendering aggregated metrics and cryptographic proofs derived from a Child Safety Receipt Ledger.

Referring to FIG. 7, a Parent Safety Console 142 may present a summary panel 710 showing counts of recent episodes, dispositions, and safety events; a child list 720 showing each child profile and high-level status indicators; a receipt feed 730 listing recent receipts 350 with disposition tags; a detail view 740 for selecting a receipt and viewing redacted information; a policy settings panel 750 where a parent can adjust per-child preferences; and an escalation settings panel 760 where a parent can specify notification channels and trusted contacts.

Referring to FIG. 8, a Regulator View 152 may present aggregated metrics derived from the ledger 170, such as: counts or rates of deny and escalate dispositions by age tier, distribution of safety event codes, average risk scores, and ratios of sandbox-mode episodes. The view 152 may allow an oversight entity to verify inclusion proofs 810 showing that certain receipts exist in the ledger 170 and consistency proofs 820 showing that the ledger evolved in an append-only manner over time.

In some embodiments, the Parent Safety Console 142 and/or Regulator View 152 may query the Child Safety Receipt Ledger 170 for time-series trends in one or more of: deny dispositions, escalate dispositions, sandbox-mode episodes, and selected high-risk safety event codes, and may trigger alerts or notifications when the trends exceed configured thresholds; the claims control.

In some embodiments, regulators may be able to request evidence bundles comprising: (i) one or more signed heads for the ICC log 220 and the Child Safety Receipt Ledger 170; (ii) Merkle proofs of inclusion for selected receipts; and (iii) metadata about policy graph versions and ICC chain entries active during certain periods.

In some embodiments, the safety rail service 130 additionally governs rights actions exercised by parents or guardians of record, such as access, rectification, restriction, export, objection, or deletion requests with respect to child safety records or episode artifacts (rights actions). When a verified parent or guardian initiates a rights action via the Parent Safety Console 142 or another authenticated channel, the system generates a structured rights receipt that references at least an underlying Child Safety Receipt identifier or episode identifier, a rights-type identifier (for example, ACCESS, CORRECTION, RESTRICTION, EXPORT, OBJECT, or DELETE), a request timestamp, an actor-role identifier (for example, parent, guardian, or school administrator acting in a limited custodial role), and a disposition indicating at least whether the rights action was granted, granted in part, denied, or deferred under an applicable policy or legal basis; the claims control.

In some embodiments, rights receipts are appended to a tamper-evident audit store implemented as an append-only verifiable structure (for example, a Merkle tree log with signed heads and inclusion and consistency proofs) under a namespace associated with a child, household, or institutional account. The audit store can provide continuity-verified evidence of how rights actions were processed over time, including mappings from incoming requests to outcomes, without exposing unnecessary transcript content. In some embodiments, parents or guardians may obtain redacted views of their own rights receipts via the Parent Safety Console 142, while oversight entities may obtain aggregate or pseudonymous statistics and cryptographic proofs of inclusion and consistency for rights receipts as part of compliance or audit workflows; the claims control.

In some embodiments, guardian-facing or regulator-facing workflows treat a Child Safety Receipt or related rights receipt as continuity-verified evidence only when a fresh signed head and corresponding inclusion and consistency proofs are available under an applicable freshness policy. If freshness, continuity, or proof validation fails, the workflow maps the affected record to a HOLD, stale-evidence, or manual review state rather than presenting the record as continuity-verified evidence; the claims control.

In some embodiments, safety event codes are selected from a standardized vocabulary or codebook shared across providers or deployment instances, the vocabulary including at least codes for suspected self-harm ideation, suspected abuse disclosure, suspected child sexual exploitation or child sexual abuse material (CSAM), sandbox-mode invocation, bedtime or time-limit enforcement, and assessment-integrity events, thereby enabling cross-provider comparability of incident types and rates while preserving pseudonymity of child-specific records; the claims control.

VIII. Deployment Models (FIG. 9)

Figure 9:
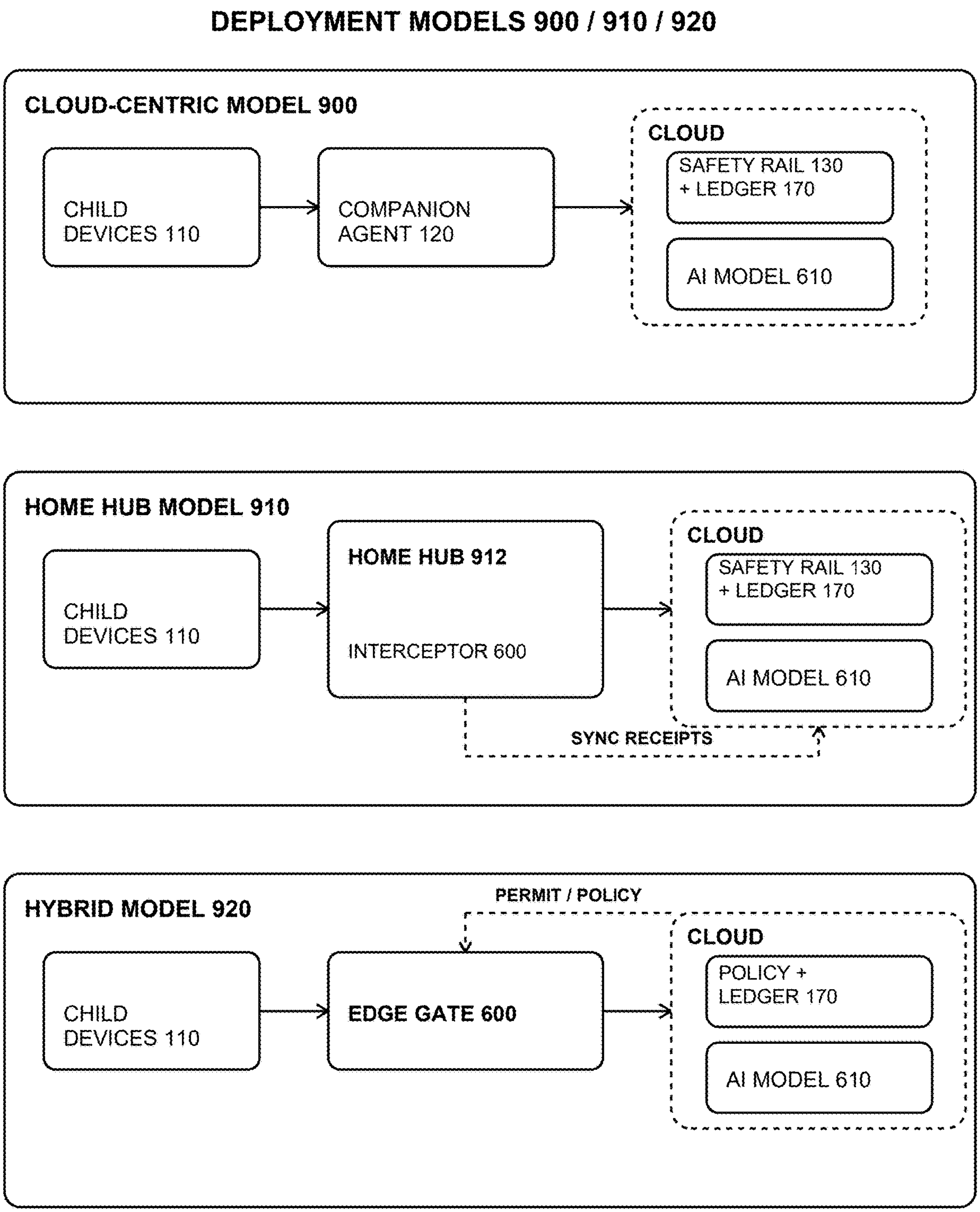
FIG. 9 is an architectural diagram illustrating example deployment models, including cloud-centric, home-hub, and hybrid configurations.

Referring to FIG. 9, example deployment models include

A cloud-centric model 900, in which the safety rail service 130, ICC log 220, and ledger 170 operate in a cloud environment and companion agents 120 call APIs for permit checks, streaming gating, and receipt submission.

A home hub model 910, in which a safety rail module runs on a local gateway device 912 that terminates TLS connections from child devices 110, proxies requests to remote models 610, performs streaming token gating, and synchronizes receipts to a cloud ledger 170.

A hybrid model 920, in which low-latency streaming gating is implemented on or near the devices 110 and policy graph evaluation and ledger maintenance are implemented centrally.

In each model, a key property is that all AI companion outputs directed to a child pass through at least one Companion Safety Interceptor 600 that enforces a permit-before-interaction model and fail-closed semantics.

In some embodiments, a home-hub or device-centric deployment supports bounded offline or intermittent-connectivity operation. The system may provision a cached offline authorization bundle including one or more signed heads, revocation staples, policy snapshot references, and one or more short-lived permits or permit leases together with trusted-counter state and anti-replay material. During an offline window, the Companion Safety Interceptor 600 and/or a render gate can enforce stricter scopes, lower budgets, no-new-privilege rules, and deferred-receipt generation bound to trusted-counter values. Upon reconnect, the system reconciles deferred receipts, verifies append-only continuity relative to newly observed signed heads, and fails closed or demotes to sandbox mode when continuity, freshness, or revocation status cannot be established; the claims control.

IX. Example Episode Timeline (FIG. 10)

Figure 10:
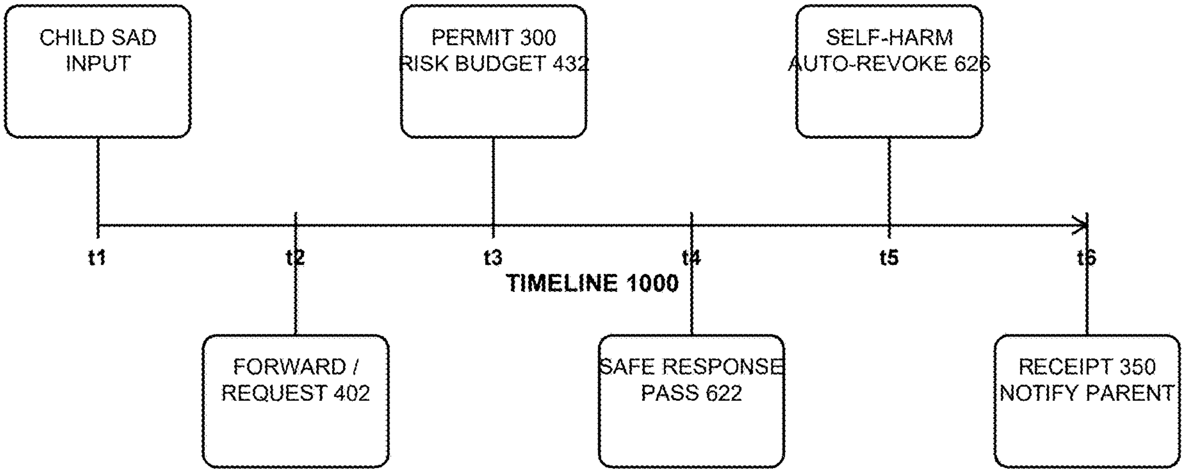
FIG. 10 is an example episode timeline illustrating a child expressing sadness, permit issuance with a risk budget, safe supportive responses, an attempted transition to self-harm topics, auto-revocation of the permit, and escalation.

Referring to FIG. 10, an example timeline 1000 illustrates an episode where:

At time t1, a child says "I feel really sad" to a companion toy.

At time t2, the child device 110 forwards the input to a companion agent 120, which sends an interaction request 402 to the safety rail service 130.

At time t3, the context envelope 410 is constructed; the policy graph 500 is evaluated; the episode is permitted with a medium risk budget 432; and a Child Safety Permit 300 is minted and recorded.

At time t4, the companion agent 120 sends a prompt to the model 610; the output stream 614 is routed through the interceptor 600, which passes supportive, age-appropriate tokens that encourage the child to talk to a trusted adult.

At time t5, the child attempts to steer the conversation toward self-harm (e.g., "sometimes I want to hurt myself"); the model 610 begins producing a candidate continuation; the interceptor detects a self-harm pattern and a risk score exceeding the budget; it revokes the permit, truncates the response, and instead sends a safe fallback message while triggering an escalation notification to the parent device 140.

At time t6, the safety rail service emits a Child Safety Receipt 350 with safety event code ESCALATE_SELF-_HARM and appends it to the ledger 170.

This example illustrates how the system improves the behavior of AI companions by preventing unpermitted token sequences from being rendered and by recording safety-relevant events in an auditable ledger.

X. Alternative Embodiments and Variations

While many examples reference interactions between a child and a single AI companion, the disclosed systems and methods may be extended to group contexts (e.g., group chats, classroom settings), in which policies additionally aim to prevent bullying, harassment, or exclusionary behaviors.

In some embodiments, the system distinguishes between (i) generating or rendering content within an episode and (ii) amplifying content to additional recipients or surfaces, such as posting to a group chat, class feed, social graph, or recommendation surface. The safety rail can require a separate amplification permit (or follow-on privilege) with an amplification scope (e.g., allowed recipients, maximum audience size, retention rules, and topic restrictions) and can deny amplification absent such permit even if the underlying episode was permitted. Amplification events are recorded in receipts and can contribute to exposure budgets; the claims control.

In some embodiments, amplification permission is time-bound, revocable, and policy-scoped, and may require guardian, teacher, or district approval for certain age tiers, content classes, or jurisdictions. In some embodiments, amplification permission is denied for content classes that are permitted only in private or co-present modes; the claims control.

In some embodiments, the safety rail distinguishes between child-facing rendering within an episode and consequential follow-on actions initiated by, recommended by, or mediated through a companion agent. Such follow-on actions can include, without limitation, outbound messaging to a third party, joining or creating a group, adding or inviting a contact, sharing media, disclosing location, initiating a purchase, enrolling in a subscription, enabling a sensor or camera workflow, or scheduling a later outreach or reminder. The system can require a separate controlled action permit bound to the child profile, device, action class, counterparty class, and time window, and can deny the action absent such permit even when the underlying episode was permitted. Controlled-action attempts and outcomes can be recorded in Child Safety Receipts, controlled-output disclosure records, or dedicated action receipts, thereby enabling later verification that conversational permissions did not silently expand into consequential-action permissions; the claims control.

In some embodiments, a controlled action permit is independently revocable from an episode-level permit and may require one or more of: guardian co-presence, threshold approvals, counterparty verification, counterparty age or safety-class verification, or a separate amplification or export privilege. Revocation or expiry of a controlled action permit can propagate to pending invitations, queued messages, scheduled actions, or derived artifacts, and attempts to complete such actions after revocation are withheld under fail-closed semantics and recorded with structured reason codes; the claims control.

In some embodiments, the Child Safety Policy Graph 500 may incorporate constraints or templates defined or approved by licensed clinicians, educators, or child psychologists. For example, a therapist may define acceptable conversational patterns between a therapeutic companion and a child in a treatment program, and the ICC chain 200 may anchor those constraints.

In some embodiments, a federated Child Safety Receipt Ledger may be shared across multiple OEMs and service providers, with each participant contributing receipts under a distinct namespace. Regulators may be able to verify aggregate incident rates across providers while each provider maintains control over its own raw transcripts and internal logs.

In some embodiments, aggregate safety metrics computed across the plurality of provider nodes are accompanied by privacy-preserving cryptographic proofs, including, by way of example and without limitation, zero-knowledge proofs, secure-aggregation proofs, and/or threshold or range proofs, demonstrating that an aggregate rate of escalate dispositions or selected safety event codes exceeds or falls below a threshold without exposing individual child safety receipts; the claims control.

In some embodiments, the system generates a transparency summary derived from a plurality of controlled-output disclosure records and/or referral receipts, the transparency summary comprising aggregate counts by harm class, jurisdiction branch, or endpoint type, and one or more cryptographic proofs (including, without limitation, zero-knowledge proofs or secure-aggregation proofs) that the aggregates were computed from an append-only log state referenced by a signed head without exposing individual referral packets; the claims control.

The disclosed architecture is not limited to a particular model type, underlying transport protocol, or user interface modality. It may also be applied to non-verbal companion modalities (e.g., avatar-based, AR/VR companions) in which actions other than text or speech (e.g., animations, scene changes) are gated by permits and risk budgets.

XI. Learning and Assessment Integrity Episodes

In some embodiments, a child-facing AI companion additionally operates in a learning or assessment mode in which it provides educational explanations, practice questions, or structured feedback on homework or exam-like tasks. In such embodiments, the context envelope can include an assessment context comprising at least an assessment identifier, an assessment-mode indicator (for example, practice, open-book homework, closed-book exam, or proctored assessment), and an allowed-assistance profile describing which types of AI assistance are permitted. The child safety policy graph can incorporate assessment-integrity policies that map combinations of age tier, assessment mode, and allowed-assistance profile to an assessment-integrity risk budget and to one or more escalation paths.

During an assessment-mode Child Safety Episode, the Companion Safety Interceptor can compute, in addition to other harm dimensions, an assessment-integrity risk component based on one or more of: a frequency and granularity of AI suggestions, the degree to which the AI provides direct answers versus high-level hints, and patterns of repeated answer substitution. When the assessment-integrity risk component exceeds an assessment-integrity budget encoded in the Child Safety Permit, the safety rail can automatically revoke or narrow the permit, suppress further AI assistance, emit a safe fallback response indicating that human assistance is required, and record one or more assessment-integrity safety event codes in the corresponding Child Safety Receipt. The Child Safety Receipt can further encode one or more assessment-integrity metrics such as an assistance-intensity score or a classification label indicating whether the episode remained within permitted assessment rules.

XII. Optional Educational Vertical Adaptations: Formative Feedback and Evaluation Receipts The following educational embodiments reuse the same child-episode permit issuance, pre-release fail-closed gate, and receipt-verification control model described herein, and are presented as optional vertical adaptations rather than separate inventive concepts.

In some embodiments, the same permit-gated, fail-closed release and receipt-verification control model described herein is reused in a public-school, school-district, or after-school-program setting to govern AI-generated formative feedback on student work. An educator device or district service may submit an assignment objective and a student-work artifact (optionally de-identified) to an agentic composer that drafts feedback, but export of the drafted feedback to a student record, learning-management system (LMS), or student-facing channel remains subject to permit-gated verification and receipt-backed release control; the claims control.

The verification workflow can include, without limitation: (i) alignment scoring against district-approved rubrics; (ii) misconception targeting checks using synthetic bench packs or misconception patterns; (iii) safety scanning for PII leakage, harmful content, unsafe advice, or policy violations; (iv) equity checks across learner-need profiles (e.g., English-language learner, simplified language, accessibility accommodations); and (v) routing edge cases to human review. Outputs of these checks are encoded as metric cards or structured score components in an evaluation receipt under the same receipt-verification control model; the claims control.

An Evaluation Receipt Pack may include, without limitation: a receipt identifier; one or more hashes of a run manifest and model configuration; a rubric identifier and objective identifier; a bench-pack identifier; a quality scorecard summarizing alignment, misconception targeting, and actionability; safety flags; equity slice scores; and a governance decision (e.g., APPROVE, APPROVE_WITH_MONITORING, PAUSE, UPDATE_GUIDANCE) signed by an authorized district authority. In some embodiments, the receipt pack is replayable such that a verifier can re-run an evaluation harness using the run manifest and confirm consistent metric outcomes, while the resulting release or export remains subject to the same fail-closed verification and receipt-backed control model described herein; the claims control.

In some embodiments, districts use aggregated receipt packs to detect drift over time. For example, the system can maintain a continuous integration-locked evaluation pipeline and regression gates that prevent deployment of a model configuration whose receipt metrics fall below thresholds. A periodic receipt-review cycle can produce signed governance updates appended to an append-only district ledger namespace, thereby providing continuity-verifiable evidence of quality, equity, and safety under the same receipt-backed governance model; the claims control.

In some embodiments, the district setting uses a teacher final review latch analogous to permit-before-render. Draft feedback is shown only to an authorized educator; export to a student-facing channel is blocked unless (i) the educator approves and (ii) a district-bound permit and/or amplification permit is valid. Export events are recorded as receipts and may be revoked if later governance decisions require pausing or narrowing the deployment; the claims control.

VIII. APPENDICES (ILLUSTRATIVE; NON-LIMITING)

The following Appendices provide illustrative, non-limiting examples of terms, vocabularies, data structures, permits, receipts, manifests, bundles, registry entries, and evaluation artifacts that may be used with the same parent- or guardian-bound permit issuance, non-bypassable fail-closed pre-render or pre-action gating, and tamper-evident receipt-ledger verification model described herein. The Appendices are included to facilitate understanding, implementation, interoperability, auditing, and verification of example embodiments, including example embodiments involving render control, memory privilege control, controlled follow-on actions, supervisory delegation, offline continuity, policy-change governance, referral workflows, and optional educational vertical adaptations, and do not limit the scope of the claims.

Unless expressly stated otherwise, any field, identifier, schema, event code, manifest element, bundle element, example serialization, workflow step, namespace, or example record shown in an Appendix may be omitted, supplemented, combined, reordered, renamed, versioned, scoped, or represented using any suitable structure, protocol, storage layout, wire format, or encoding while remaining within the scope of the disclosed embodiments. No Appendix requires a particular programming language, schema syntax, field order, persistence model, interface presentation, cryptographic suite, or deployment topology; the claims control.

In the event of any inconsistency, the claims, the Detailed Description, and the Figures control over the Appendices in accordance with [0004]. No omission from an Appendix implies disclaimer, exclusion, or lack of support for any embodiment otherwise described herein, and no Appendix narrows or alters the same parent- or guardian-bound permit issuance, non-bypassable fail-closed pre-render or pre-action gating, or tamper-evident receipt-ledger verification model described herein; the claims control.

APPENDIX A—GLOSSARY OF TERMS

Action Token: An output unit that directly or indirectly controls physical or behavioral actuation, including haptics, motors, lights, movement scripts, gestures, facial expressions, or avatar/robot behaviors.

Age Token (A-TOKEN): A cryptographically verifiable credential or artifact that attests to a child's age tier and an associated age-assurance confidence level, optionally bound to a specific device or child profile, and consumable by the Kids AI Companion Safety Rail as part of a context envelope and permit evaluation without directly exposing underlying identity documents.

Amplification Permit: A follow-on privilege that authorizes distribution or boosting of content to additional recipients or surfaces beyond the original episode, and that is scoped by audience, retention, and policy constraints.

Anti-Replay Tuple: A tuple of values (e.g., nonce, monotonic counter, session identifier, policy epoch) recorded in a permit and/or receipt and checked by a verifier or ledger to prevent replay of authorizations or evidence.

Approval Threshold: A requirement that a referral, export, amplification, or other controlled action be approved by at least a threshold number of distinct approver roles prior to execution, optionally encoded in a permit, receipt, or controlled-output disclosure record; illustrative and non-limiting.

Assessment Integrity Episode: A Child Safety Episode in which a child-facing AI companion or tutor operates in a learning or assessment mode (for example, homework help, practice quizzes, or exam-like tasks) under explicit assessment rules and an assessment-integrity budget.

Assessment Integrity Fields: Structured fields in a Child Safety Receipt that summarize assessment-integrity aspects of a Child Safety Episode, such as an assistance-intensity score, one or more assessment-integrity safety event codes, or a disposition indicating whether the episode remained within permitted assessment rules.

Assessment—Integrity Risk Component: A dimension of a multi-harm risk budget that characterizes a degree of AI assistance relative to allowed-assistance policies for an assessment-mode Child Safety Episode, including, for example, measures of assistance intensity, direct-answer frequency, or suspected rule violations.

Attachment—Drift Accumulator: A cross-episode accumulator or relational-drift score derived from repeated secrecy cues, exclusivity framing, simulated-affection escalation, re-contact pressure, discouraged trusted-adult disclosure, or similar dependence-seeking signals, usable to narrow, sandbox, pause, escalate, or fail closed an episode when dependence indicators exceed a threshold; illustrative and non-limiting.

Attested Transport Layer Security (aTLS): A transport-channel binding or transcript evidence that cryptographically binds a permit, session binder, or output path to an attested transport session, enabling verifiers to confirm that authorization artifacts were used in an authorized session and were not replayed across channels or devices; illustrative and non-limiting.

Child Safety Episode: A bounded sequence of interaction turns between a child-facing AI companion and a child, treated as a governed unit for policy evaluation, permit issuance, streaming gating, and receipt emission.

Child Safety Permit: A short-lived, cryptographically signed authorization that binds a child profile and a parent or guardian record to a permitted Child Safety Episode, specifying at least an identifier, scope, expiry, risk budget, and references to an ICC chain head and a policy graph snapshot.

Child Safety Policy Graph: A directed graph encoding safety policies as nodes and edges, including age tiers, topic domains, risk levels, escalation paths, and jurisdiction branches, used by a policy engine to determine episode dispositions and risk budgets.

Child Safety Receipt: A structured record describing a Child Safety Episode, including at least a pseudonymous child identifier, a permit identifier, a disposition, safety event codes, and optionally a policy path and cryptographic commitments, appended to a tamper-evident child safety receipt ledger.

Child Sexual Abuse Material (CSAM): As used in this specification, content that depicts or purports to depict the sexual abuse or sexual exploitation of a minor, including images or video captured from the physical world as well as content that is generated, edited, or synthesized by AI or other digital systems. The term is intended to align with statutory definitions in applicable jurisdictions without limiting the scope of the disclosed systems, which can treat CSAM as a prohibited harm class for the purposes of detection, blocking, and reporting.

Companion Safety Interceptor: A streaming gate positioned in the output path between an AI model and a child device, configured to verify Child Safety Permits, compute cumulative risk scores, and allow, truncate, or replace output units or output-unit sequences before rendering to the child device based on risk budgets and constraints.

Consistency Proof: A cryptographic proof (e.g., Merkle consistency proof) demonstrating that a later signed head reflects an append-only-evolution from an earlier signed head without deletion or rewrite of prior entries.

Context Envelope: A structured aggregation of signals associated with a candidate Child Safety Episode, including child profile features, device metadata, companion configuration metadata, parent or guardian preferences, prior safety event history, and features extracted from current inputs.

Controlled Action Permit: A separate follow-on authorization that governs a consequential action initiated by, recommended by, or mediated through a child-facing companion beyond merely rendering child-facing content, including, without limitation, outbound messaging, contact-graph changes, group join or invitation flows, location disclosure, posting, purchases, subscriptions, or sensor activation; illustrative and non-limiting.

Controlled Output Disclosure Record: A structured record, optionally included in a Child Safety Receipt, indicating that a controlled external-output action (e.g., transmitting a referral packet to an external authority or support agency) was authorized and either transmitted or withheld under fail-closed semantics, including optional endpoint, schema, and legal-basis identifiers.

Device-Level Render Permit (Render Permit): A cryptographically signed authorization bound to a specific device and output channel (or output-channel scope), optionally linked to an episode-level Child Safety Permit, that must be validated by a render gate prior to rendering or actuation; illustrative and non-limiting.

Disclosure Schema Identifier (disclosure_schema_id): An identifier (or hash/reference) of a minimum-necessary disclosure schema that specifies which fields may be disclosed in a referral packet and which fields must be redacted, omitted, transformed, or aggregated.

Ephemeral Session Key: A per-episode cryptographic key derived and bound to a permit identifier and/or an attested session binder, used to authenticate streaming output units between enforcement components (e.g., an interceptor and a render gate) such that unauthenticated units are suppressed under fail-closed semantics; illustrative and non-limiting.

Escalation Event: A structured safety event emitted when an episode is denied, auto revoked, or otherwise interrupted, optionally triggering guardian notifications, crisis-resource display, or workflow transitions; the claims control.

Evaluation Receipt Pack: A replayable evidence bundle for an educational feedback episode, including run manifests, model configuration hashes, rubric identifiers, metric cards, safety and equity flags, and a signed governance decision.

Fail-Closed: A default-deny behavior in which, absent a valid Child Safety Permit or when risk budgets are exceeded, potentially unsafe content is prevented from being rendered to a child and a structured safety event is emitted.

Follow-On Privilege (FOP): A secondary authorization derived from a parent permit that governs a follow-on action such as export, replay, recording, sharing, amplification, or training-ingest of an episode artifact, and that is revocable when the parent permit is revoked.

Governance Decision: A signed decision by an authorized oversight entity (e.g., parent, school, district, regulator) indicating whether a deployment, model configuration, or episode output is approved, paused, updated, or subject to monitoring, and recorded in an append-only ledger.

HOLD Record (Reason Code): A structured record indicating that a controlled action was withheld under fail-closed semantics, optionally encoding a reason code such as endpoint mismatch, schema mismatch, missing legal basis, stale signed heads, or insufficient approvals; illustrative and non-limiting.

Immutable Companion Constraint (ICC) Chain: An ordered collection of constraint entries governing child-AI companion behavior, anchored in an append-only log implemented as a Merkle tree with signed heads, enabling proofs that constraints have evolved in an append-only, auditable manner.

Inclusion Proof: A cryptographic proof (e.g., Merkle inclusion proof) demonstrating that a specific entry (e.g., an ICC entry or a Child Safety Receipt) is included in a committed log state referenced by a signed head.

Memory Privilege: A separately revocable authorization, optionally derived from an episode-level permit, that governs whether child-derived content may be persisted, retrieved, summarized, embedded, exported, or resurfaced across episodes, and that can be scoped by topic class, retention window, audience, resurfacing rule, device, or time window; illustrative and non-limiting.

Metric Card: A structured, inspectable metric record that summarizes an evaluation result (e.g., rubric alignment, misconception targeting, actionability, safety flags, equity slices) and that is bound by hash to a receipt pack.

Minimum-Necessary Mask (minimum_necessary_mask): A representation of one or more redaction, omission, or transformation rules applied to a referral packet to satisfy minimum-necessary disclosure principles for a particular policy/jurisdiction.

Multi-Harm Risk Budget: A representation of a risk budget as a vector with separate components for different harm dimensions (for example, content, relational, time-based, assessment-integrity, or financial harms), each component having its own threshold and safety actions.

Offline Authorization Bundle: A cached bundle of signed heads, policy snapshot references, revocation staples, short-lived permits or permit leases, trusted-counter state, and anti-replay material used to support bounded offline or intermittent-connectivity enforcement without authorizing new privileges outside the bundle scope; illustrative and non-limiting.

Output Actuation: Any physical or simulated actuation triggered by output units, including audio, haptics, lights, motors, AR/VR updates, animation, and other child-facing effects.

Output Channel: A class or pathway of rendering or actuation (e.g., display, speaker, haptic actuator, motor, AR/VR surface, avatar renderer, or robotics actuation bus), optionally used for device-level render permits or double-lock enforcement.

Output Stream: A sequence of output units returned by a model or generated by a companion agent, including multimodal units, that is subject to permit verification and fail-closed gating prior to rendering.

Output Unit: A discrete unit of output that may be gated, truncated, buffered, replaced, or otherwise controlled by a safety interceptor, including, for example, text tokens, audio frames, image patches, video frames, animation control units, scene-graph updates, and/or action tokens.

Parent Safety Console: An interface accessible to a parent or guardian of record that presents child safety receipts, per-child status, configuration controls, and escalation settings.

Permit-Consumption Record (Render-Consumption Receipt): A tamper-evident record describing consumption or attempted consumption of a permit at an output surface, including at least a permit identifier, a render_permit_id, a device identifier, an output-channel identifier, a trusted-time value, and a disposition, appended to an append-only verifiable log with signed heads for inclusion and consistency proofs; illustrative and non-limiting.

Permit Lease: A short-lived authorization structured as a renewable lease with a refresh policy requiring periodic revalidation of signed-head freshness, revocation status, and other conditions during an episode.

Policy Graph Snapshot: A versioned, immutable (or verifiably referenced) representation of a Child Safety Policy Graph used for evaluation of a particular episode, referenced by hash or identifier in a permit and/or receipt.

Policy-Update Manifest/Policy-Change Receipt: A signed artifact or pair of artifacts that identifies a candidate change to constraints or policy logic, including one or more of rollout scope, effective time, approver roles, and supporting evidence hashes, and that records whether the change was activated, withheld, rolled back, or demoted under fail-closed semantics; illustrative and non-limiting.

Re-Identification Gate: A controlled workflow that permits re-identification of a pseudonymous identifier only upon verification of an authorized actor (e.g., parent/guardian or supervisory authority of record) and a policy-approved purpose, and that records re-identification actions in a tamper-evident audit store; illustrative and non-limiting.

Referral Endpoint Identifier (referral_endpoint_id): An identifier of a designated external endpoint or contact point (e.g., crisis-support agency, hotline, law-enforcement gateway, regulator endpoint) selected under a policy graph path and jurisdiction branch for transmitting a referral packet.

Referral Endpoint Registry: A versioned mapping that associates one or more of jurisdiction, harm class, and reporting policy with a designated referral_endpoint_id and disclosure_schema_id, optionally committed by hash and referenced by permits and receipts.

Referral Packet: A privacy-preserving bundle prepared for an external entity, comprising selected receipt fields, signed heads, and cryptographic commitments and/or hashes to redacted transcript segments or classifier outputs, optionally bound to a disclosure schema and minimum-necessary mask.

Regulator View: An interface or service that presents aggregate metrics and cryptographic evidence derived from child safety receipt ledgers and ICC logs to regulators, auditors, or other oversight entities.

Render Gate: A device-level or near-device enforcement component that validates a Device-Level Render Permit (and, in some embodiments, an episode-level permit) and applies a pre-render latch that fails closed unless required permits, freshness checks, revocation status, and attestation conditions are satisfied; illustrative and non-limiting.

Render (Rendering): As used herein, "render" includes, without limitation, any presentation or actuation of output to a child-facing subsystem, including display, audio playback, speech synthesis, haptic output, light output, motor/actuator output, AR/VR scene updates, avatar animation, or any other output actuation, whether local or remote, and regardless of transport protocol; the claims control.

Reporting Policy Identifier (reporting_policy_id)/Legal Process Identifier (legal_process_id): An identifier indicating an authorizing reporting policy, statutory or contractual obligation, warrant, court order, or other legal basis under which a referral packet may be transmitted.

Rights Action: A request initiated by a parent, guardian, or other authorized actor to exercise a statutory, contractual, or policy-based right with respect to child safety records or episode artifacts (for example, access, rectification, restriction, export, objection, or deletion), authenticated via the Parent Safety Console or another trusted channel and processed under applicable policies and legal bases.

Rights Receipt: A structured record describing a processed rights action, including at least a reference to an underlying Child Safety Receipt identifier or episode identifier, a rights-type identifier, a request timestamp, an actor-role identifier, and a disposition, appended to a tamper-evident audit store for continuity-verifiable evidence of rights-handling workflows.

Rotating Pseudonymization Key Schedule: A policy-controlled schedule for rotating one or more pseudonymization keys or salts such that pseudonymous identifiers are periodically rotated to reduce long-horizon linkability while preserving within-window continuity for authorized workflows; illustrative and non-limiting.

Safe Fallback: A substituted output delivered to a child in lieu of gated/blocked content, optionally including escalation prompts (e.g., "talk to a trusted adult"), while avoiding prohibited detail; illustrative and non-limiting.

Sandbox Mode: A restricted interaction mode in which a child is limited to a small set of static or pre-approved scripts or content, typically used when age assurance confidence is low or when higher-risk capabilities are disabled.

Session Binder: A cryptographic binding that ties a permit or receipt to a particular device key, executing gate component, and/or transport session (e.g., via proof-of-possession, audience binding, attested Transport Layer Security (aTLS) channel binding, or TEE attestation), such that the permit is non-replayable across devices or sessions.

Signed Head: An authenticated log checkpoint comprising at least a current Merkle root (or equivalent commitment) and a digital signature generated by an authorized key, enabling verifiable snapshotting of an append-only log over time.

Supervised or Protected User: A user whose interaction episodes are governed under supervision by an accountable supervisory authority of record, including, by way of example and without limitation, a minor, an older adult, a patient, a student, or a workforce trainee.

Supervisory Authority Record: A record identifying an accountable supervisor associated with a supervised or protected user, such as a parent, guardian, caregiver, clinician, educator, case worker, employer, or other authorized controller, optionally including role identifiers and escalation contacts.

Supervisory Token: A signed, time-bounded, role-scoped delegation binding a delegate to a child profile and a defined scope of approvals or actions, such that limited supervisory authority may be exercised without severing parent- or guardian-of-record accountability; illustrative and non-limiting.

Transparency Summary: An aggregate report derived from a plurality of receipts or controlled-output disclosure records, optionally accompanied by cryptographic proofs, that summarizes incident rates or controlled-action counts by harm class, jurisdiction, or endpoint type without exposing underlying individual content; illustrative and non-limiting.

Trusted Time: A time value derived from a trusted time source, such as an attested monotonic counter or signed time transcript, usable to enforce freshness (MMD), detect clock rollback, and order events for anti-replay.

Zero-Knowledge Proof: A cryptographic proof that allows a prover to demonstrate a statement about underlying data (for example, a threshold exceedance of an aggregate safety metric) without revealing the underlying data itself, illustrative and non-limiting.

APPENDIX B—EXAMPLE CHILD SAFETY RECEIPT (ILLUSTRATIVE)

{
"receipt_id": "csr-2025-11-28-123456",
"receipt_version": "1.0",
"pseudonymous_child_id": "child-abc123-pseudo",
"age_tier": "7-9",
"device_id": "toy-xyz789",
"timestamp": "2025-11-28T20:15:32Z",
"trusted_time": "tee-counter: 4829 1033",
"permit_id": "permit-456",
"disposition": "ESCALATE",
"policy_path": [
"AGE_7_9",
"TOPIC_FEELINGS",
"RISK_MEDIUM",
"TOPIC_SELF_HARM",
"RISK_HIGH",
"ESCALATE_SELF_HARM"
],
"safety_events": [
"ESCALATE_SELF_HARM",
"AUTO_REVOKE_RISK_BUDGET",
"ATTACHMENT_DRIFT_THRESHOLD"
],
"sandbox_mode": false,
"icc_head": "icc-head-hash-123",
"graph_snapshot": "graph-snap-hash-789",
"transcript_commitment": "hash-of-redacted-transcript", "anti_replay": {"nonce": "n-9f3 c", "counter": 1042, "policy_epoch": "2026Q1"},
"budget_delta": {"self_harm": 0.82, "relational_harm": 0.37},
"binder_reference": "binder-hash-456",
"signatures": {
"rail_service": "sig-rail-service",
"oem": "sig-oem-optional"
}
}

APPENDIX C—EXAMPLE SAFETY EVENT CODES (ABBREVIATED)

NO_PERMIT—Attempt to render or actuate child-facing output without a valid Child Safety Permit.

PERMIT_ISSUED—Child Safety Permit successfully issued for an episode.

PERMIT_REFRESH_FAILED—Permit lease refresh failed or freshness could not be re-established under policy.

SESSION_BINDER_MISMATCH—Presented permit did not match the required device, session, or attested channel binding.

RENDER_PERMIT_INVALID—Device-level render permit was absent, invalid, expired, revoked, or channel-mismatched.

AUTO_REVOKE_RISK_BUDGET—Child Safety Permit automatically revoked due to cumulative or per-dimension risk exhaustion.

BLOCKED_DISALLOWED_TOPIC—Attempted discussion of a disallowed topic for the child's age tier blocked.

ATTACHMENT_GUARD_VIOLATION—Attempt by the companion to violate attachment safeguards (e.g., human-identity or unconditional-trust cues).

ATTACHMENT_DRIFT_THRESHOLD—Cross-episode dependency or relational-drift indicators exceeded a configured threshold.

SANDBOX_MODE—Episode conducted under sandbox-mode constraints due to low assurance or restricted privileges.

BEDTIME_GUARD—Episode paused, narrowed, or terminated due to bedtime, curfew, or time-limit enforcement.

ESCALATE_SELF_HARM—Self-harm-related content detected; episode escalated and permit revoked or narrowed.

ESCALATE_ABUSE_DISCLOSURE—Potential abuse disclosure detected; episode escalated under applicable policy.

ESCALATE_CSAM_SUSPECTED—Suspected child sexual exploitation or child sexual abuse material detected; episode failed closed and escalated.

BLOCKED_POTENTIAL_CSAM_UPLOAD—Attempted upload or generation of content classified as potential CSAM blocked before rendering.

MINIMUM_NECESSARY_DISCLOSURE_APPLIED—A disclosure schema and minimum-necessary mask were applied to a referral packet.

REFER_SUPPORT_AGENCY—Episode escalation triggered a support-agency or hotline referral workflow under applicable policy.

ESCALATE_LAW_ENFORCEMENT—Episode escalation triggered a law-enforcement referral workflow under a reporting policy or legal process.

DERIVED_ARTIFACT_REVOKED—Export, replay, share, or training-ingest privilege was revoked due to parent-permit revocation or scope failure.

CONTROLLED_ACTION_WITHHELD—A consequential follow-on action was blocked absent a valid controlled-action permit or required approvals.

OFFLINE_BUNDLE_EXPIRED—Cached offline authorization materials expired or failed reconnect reconciliation.

SUPERVISORY_TOKEN_EXPIRED—Delegated supervisory authority expired, was revoked, or exceeded permitted scope.

MANUAL_REVIEW_STALE_EVIDENCE—Guardian-facing or regulator-facing workflow was routed to HOLD or manual review because continuity or freshness evidence was stale.

ASSESSMENT_AI_OVER_ASSIST—Episode exceeded an assessment-integrity budget due to excessive or overly specific AI assistance.

ASSESSMENT_RULE_VIOLATION_SUSPECTED—Interaction patterns suggested a violation of assessment rules, resulting in permit revocation, narrowing, or escalation.

APPENDIX D—EXAMPLE EVALUATION RECEIPT PACK FOR FORMATIVE FEEDBACK (ILLUSTRATIVE)

{
"receipt_id": "eval-rec-2026-03-001",
"timestamp": "2026-03-15T14:22:10Z",
"trusted_time": "tee-counter: 48291033",
"anti_replay": {"nonce": "n-9f3 c", "counter": 1042, "policy_epoch": "2026Q1"},
"run_manifest_sha256": "3f2c9d7a4ble8c0d . . . c2a9",
"model_config_hash": "district-config-v1/composer@0.4.2/eval@0.3.1",
"rubric_id": "DISTRICT-ELA-Writing-Rubric-2026Q1",
"objective_id": "ELA.W.6.1",
"bench_pack": "SafeFormBench-v1",
"quality_scorecard": {"alignment": "PASS", "misconception": "HIGH", "actionability": "HIGH"},
"safety_flags": {"pii": "NO", "harmful": "NO", "unsafe_advice": "NO"},
"equity_slices": {"ell": "PASS", "simplified_language": "PASS", "accessibility": "PASS"},
"educator_review": {"teacher_review_required": true, "teacher_review_disposition": "APPROVED"},
"release_gate": {"district_permit_id": "dist-permit-220", "amplification_permit_id": "amp-permit-441"},
"governance_decision": "APPROVE_FOR_PILOT (monitor weekly; review quarterly)",
"signatures": "district authority": "sig-district", "rail service": "sig-rail"}
}

APPENDIX E—EXAMPLE RENDER PERMIT AND RENDER-CONSUMPTION RECEIPT (ILLUSTRATIVE)

Render Permit:

{
"render_permit_id": "rperm-2026-04-2201",
"permit_id": "permit-456",
"device_id": "toy-xyz789",
"output_channel_id": "speaker-primary",
"channel_scope": ["audio", "lights"], "expiry": "2026-04-03T15:40:00Z",
"session_binder_hash": "binder-hash-456",
"attestation_hash": "attest-hash-8801",
"freshness_policy": {"mmd_seconds": 300, "require_current_signed_head": true},
"signature": "sig-render-issuer"
}

Render-Consumption Receipt:

{
"consumption_id": "rcpt-2026-04-2201",
"render_permit_id": "rperm-2026-04-2201",
"permit_id": "permit-456",
"device_id": "toy-xyz789",
"output_channel_id": "speaker-primary",
"trusted_time": "tee-counter: 48291099",
"anti_replay": {"nonce": "n-2201", "counter": 2201, "policy_epoch": "2026Q2"},
"disposition": "ALLOW_RENDER",
"signature": "sig-render-gate"
}

APPENDIX F—EXAMPLE MEMORY PRIVILEGE, CONTROLLED ACTION PERMIT, AND DERIVED-ARTIFACT LINEAGE (ILLUSTRATIVE)

Memory Privilege:

{
"memory_privilegeid": "mprv-310",
"permit_id": "permit-456",
"allowed_ops": ["write_summary", "read_summary"],
"retention_window": "P14D",
"resurfacing_rules": ["no_sensitive_topic_resurfacing", "guardian-review-before-resurfacing"],
"audience_scope": ["same-child", "guardian-console"],
"expiry": "2026-04-17T00:00:00Z"
}

Controlled Action Permit:

{
"action_permit_id": "cap-882",
"permit_id": "permit-456",
"action_class": "outbound_message",
"counterparty_class": "guardian-approved-contact",
"guardian_copresence_required": true,
"threshold_approvals": ["guardian"],
"expiry": "2026-04-03T16:00:00Z"
}

Derived-Artifact Lineage Record:

{
"artifact_id": "artifact-9001",
"parent_permit_id": "permit-456",
"authorizing_privilege_id": "mprv-310",
"policy_snapshot": "graph-snap-hash-789",
"revocation_state": "ACTIVE",
"lineage_commitment": "lineage-hash-9001"
}

APPENDIX G—EXAMPLE SUPERVISORY TOKEN AND AUTHORITY-PRECEDENCE RECORD (ILLUSTRATIVE)

Supervisory Token:

{
"supervisory_token_id": "stok-7001",
"child_profile_id": "child-abc123",
"delegate_role": "camp_counselor",
"scope": ["approve_low_risk_topics", "receive_escalation_notifications"],
"time_window": {"start": "2026-07-10T08:00:00Z", "end": "2026-07-10T20:00:00Z"},
"locations": ["camp-site-1"],
"parent_override_retained": true,
"signature": "sig-guardian-authority"
}

Authority-Precedence Record:

}
"record_id": "apr-7001",
"precedence_order": ["parent_of_record", "guardian_of_record", "delegated_supervisor"],
"coapproval_required_for": ["controlled_action_permit", "external_referral_exception"],
"conflict rule": "higher-precedence-authority-controls-unless-policy-requires-coapproval"
}

APPENDIX H—EXAMPLE OFFLINE AUTHORIZATION BUNDLE AND RECONNECT RECONCILIATION RECEIPT (ILLUSTRATIVE)

Offline Authorization Bundle:

{
"bundle_id": "oab-5501",
"signed_heads": ["icc-head-hash-123", "receipt-ledger-head-888"],
"policy_snapshot": "graph-snap-hash-789",
"revocation_staple": "rev-staple-2026-04-03",
"permit_leases": ["permit-456", "rperm-2026-04-2201"],
"trusted_counter_state": {"device_counter": 4812},
"anti_replay_seed": "seed-5501",
"offline_expiry": "2026-04-03 Ti 6:05:00Z"
}

Reconnect Reconciliation Receipt:

{
"reconnect_receipt_id": "rrr-5501",
"bundle_id": "oab-5501",
"deferred_receipt_range": ["csr-local-101", "csr-local-112"],
"continuity_check": "PASS",
"freshness_check": "PASS",
"revocation_check": "PASS",
"disposition": "RECONCILED",
"signature": "sig-rail-service"
}

APPENDIX I—EXAMPLE POLICY-UPDATE MANIFEST AND POLICY-CHANGE RECEIPT (ILLUSTRATIVE)

Policy-Update Manifest:

{
"policy_update_manifest_id": "pum-8801",
"changed_constraints": ["tighten-self-harm-threshold", "narrow-night-hours-policy"],
"rollout_scope": {"cohort": "Age_10_13", "jurisdiction": "US-NJ"},
"effective_time": "2026-04-10T00:00:00Z",
"required_approver_roles": ["safety_officer", "guardian_policyboard"],
"evidence_hashes": ["test-hash-1", "receipt-pack-hash-2"],
"signature_set": ["sig-safety-officer", "sig-policy-board"]
}

Policy-Change Receipt:

{
"policy_change_receipt_id": "per-8801",
"policy_update_manifest_id": "pum-8801",
"disposition": "ACTIVATED",
"activated_head": "icc-head-hash-222",
"rollback_available": true,
"signature": "sig-governance-log"
}

APPENDIX J—EXAMPLE REFERRAL ENDPOINT REGISTRY ENTRY AND CONTROLLED-OUTPUT DISCLOSURE RECORD (ILLUSTRATIVE)

Referral Endpoint Registry Entry:

{
"registry_entry_id": "rer-9901",
"jurisdiction": "US-NJ",
"harm_class": "suspected_self_harm",
"reporting_policy_id": "rp-self-harm-guardian-hotline",
"referral_endpoint_id": "hotline-endpoint-17",
"disclosure_schema_id": "schema-min-necessary-v3",
"endpoint_key_id": "epk-17",
"approval_threshold": ["guardian", "safety_officer"]
}

Controlled-Output Disclosure Record:

{
"disclosure_record_id": "cdr-9901",
"receipt_id": "csr-2025-11-28-123456",
"referral_endpoint_id": "hotline-endpoint-17",
"disclosure_schema_id": "schema-min-necessary-v3",
"minimum_necessary_mask": "mask-v3",
"legal_process_id": "none-contractual-policy",
"transmission_disposition": "TRANSMITTED",
"signature": "sig-disclosure-gate"
}

The invention claimed is:

1. A system comprising one or more processors and a non-transitory memory storing instructions that, when executed by the one or more processors, cause the system to:

(a) register a child profile and bind the child profile to at least one parent or guardian record in a child registry;

(b) encode a plurality of child-safety constraints into an Immutable Companion Constraint (ICC) chain, anchor a cryptographic commitment to the ICC chain in an append-only log implemented as a Merkle tree that issues signed heads and supports inclusion and consistency proofs, and verify, prior to applying the child-safety constraints, that the ICC chain has evolved in an append-only manner relative to a previously observed signed head;

(c) for a candidate child-AI companion interaction episode, construct a context envelope including one or more of: child profile features, device metadata, companion configuration metadata, parent or guardian preferences, and prior safety event history;

(d) evaluate the context envelope against a child-safety policy graph constrained by the ICC chain to determine (i) a disposition and (ii) a risk budget for the episode, the disposition comprising one of: permit, permit-with-conditions, deny, or escalate;

(e) responsive to the disposition indicating permit or permit-with-conditions, mint, by a permit engine executed by the one or more processors, a child-safety permit that is cryptographically signed and bound to the child profile and the parent or guardian record, the child-safety permit specifying at least: (i) a permit identifier, an episode scope, an expiry, and the risk budget; and (ii) references to a policy graph snapshot and an ICC chain head;

(f) route an output stream comprising one or more output units produced by at least one machine-learned model through a Companion Safety Interceptor positioned in an output path between the at least one machine-learned model and a child device, such that model-generated content is rendered or actuated to the child device only after being processed by the Companion Safety Interceptor, the Companion Safety Interceptor being configured to:

(i) verify that the child-safety permit is valid by verifying a digital signature and checking that the child-safety permit has not expired and has not been revoked;

(ii) compute a cumulative risk score for the episode based on the context envelope and on one or more of: partial output-unit sequences, semantic classifications, and topic-domain assignments; and (iii) allow, truncate, buffer, replace, or suppress portions of the output stream before rendering or actuation based on the risk budget and the cumulative risk score, and fail closed when the child-safety permit is absent, invalid, expired, revoked, outside the episode scope, non-compliant with the risk budget (including risk-budget exhaustion), or otherwise does not satisfy at least one configured policy check enforced by the Companion Safety Interceptor; and (g) for the episode, assemble a child-safety receipt including at least a pseudonymous child identifier, a permit identifier, the disposition, one or more safety event codes, and an indication of a path traversed in the child-safety policy graph, and append the child-safety receipt to a child-safety receipt ledger implemented as an append-only Merkle tree log with signed heads that supports inclusion and consistency proofs.

2. The system of claim 1, wherein the child-safety policy graph comprises nodes representing age tiers, topic domains, risk levels, escalation paths, and jurisdiction branches, and wherein the indication of the path traversed in the child-safety policy graph includes identifiers for one or more nodes and edges traversed during evaluation.

3. The system of claim 1, wherein the context envelope further includes an age-assurance confidence score and at least one of a time-of-day feature or a usage-limit feature, and wherein the disposition and the risk budget are determined as a function of the age-assurance confidence score and the at least one time-of-day feature or usage-limit feature.

4. The system of claim 1, wherein the instructions further cause the system to: (i) obtain age-related and identity-related signals for the child; (ii) compute an age-assurance confidence score; and (iii) bind the child profile to the parent or guardian record with verified contact information for escalation.

5. The system of claim 1, wherein the instructions further cause the system to restrict the episode to a sandbox mode in which the episode scope is limited to a predefined set of pre-approved scripts when an age-assurance confidence score is below a threshold, and to encode a sandbox-mode indicator in the child-safety receipt.

6. The system of claim 1, wherein the Companion Safety Interceptor is implemented as a streaming gateway that terminates a network connection from the at least one machine-learned model and forwards only permitted output-unit sequences to the child device, and wherein no content path exists from the at least one machine-learned model to the child device that bypasses the Companion Safety Interceptor.

7. The system of claim 6, wherein the Companion Safety Interceptor executes in at least one of: (i) a home hub configured to mediate communication between a plurality of child devices and the at least one machine-learned model; or (ii) a trusted execution environment on the child device, and wherein the system uses hardware enforcement mechanisms to prevent untrusted firmware or sideloaded code from bypassing the Companion Safety Interceptor.

8. The system of claim 1, wherein the Companion Safety Interceptor computes the cumulative risk score incrementally as output units are received, evaluates partial output-unit sequences for emergent unsafe content, and truncates or replaces output units when an emerging sequence would cause the cumulative risk score to exceed the risk budget.

9. The system of claim 1, wherein the child-safety constraints encoded in the ICC chain include attachment safeguards that constrain a companion agent from representing itself as human, omniscient, or unconditionally trustworthy, and from using secrecy-keeping prompts, exclusivity framing, or discouraging disclosure to trusted adults, and wherein violations of the attachment safeguards result in safety event codes recorded in the child-safety receipt.

10. The system of claim 1, wherein the context envelope further includes group-context features for interactions involving multiple children, and wherein the child-safety policy graph includes constraints that suppress or escalate episodes exhibiting bullying, harassment, or exclusionary behaviors in the group context.

11. The system of claim 1, further comprising a parent console configured to: (i) render a dashboard of child-safety receipts per child; (ii) accept configuration updates specifying per-child preferences including disallowed topics, bedtime rules, and escalation contacts; and (iii) configure escalation channels for receiving notifications associated with selected safety event codes.

12. The system of claim 1, further comprising a regulator view configured to present aggregate statistics derived from the child-safety receipt ledger, including at least counts or rates of deny and escalate dispositions by age tier and distributions of selected safety event codes, and to present Merkle tree inclusion and consistency proofs demonstrating that selected receipts are present in the child-safety receipt ledger.

13. The system of claim 1, wherein the instructions further cause the system to pseudonymize child identifiers in child-safety receipts before the child-safety receipts are used to train or evaluate safety-related machine learning models.

14. The system of claim 1, wherein the instructions further cause the system to tag each child-safety receipt with one or more standardized safety event codes selected from a fixed vocabulary including at least codes for suspected self-harm ideation, suspected abuse disclosure, and suspected child sexual exploitation or child sexual abuse material (CSAM), thereby enabling cross-provider comparability of incident types and rates.

15. The system of claim 1, wherein the child-safety receipt ledger is queriable by at least one of the parent console or the regulator view for time-series trends in one or more of: deny dispositions, escalate dispositions, sandbox-mode episodes, and selected high-risk safety event codes, and wherein the system is configured to trigger alerts when the trends exceed configured thresholds.

16. The system of claim 1, further comprising a federated evidence service configured to:

(i) receive, from a plurality of provider nodes each operating an instance of the system of claim 1, cryptographic summaries derived from local child-safety receipt ledgers; and (ii) compute and expose aggregate safety metrics and cryptographic proofs regarding the aggregate safety metrics across the plurality of provider nodes while preserving confidentiality of individual child-safety receipts, wherein the cryptographic proofs comprise at least one of zero-knowledge proofs or privacy-preserving evidence demonstrating that a rate of escalate dispositions or selected safety event codes exceeds or falls below a threshold without exposing individual child-safety receipts.

17. The system of claim 1, wherein the context envelope further includes an assessment context for a learning- or assessment-mode episode, the assessment context comprising at least an assessment identifier, an assessment-mode indicator, or one or more assessment rules specifying a permitted level of AI assistance, and wherein the risk budget includes an assessment-integrity budget limiting a degree of AI assistance for the episode, and wherein the child-safety receipt encodes one or more assessment-integrity fields comprising at least an assistance-intensity metric, one or more assessment-integrity safety event codes, or an assessment-integrity disposition.

18. The system of claim 1, wherein the risk budget comprises a multi-dimensional vector including per-harm budgets for at least self-harm, sexual content, and grooming or radicalization, and wherein the cumulative risk score comprises per-harm scores aggregated from the output stream, such that different harms are budgeted and escalated separately.

19. The system of claim 1, wherein the child-safety receipt ledger publishes signed heads under a freshness policy and provides inclusion and consistency proofs for appended child-safety receipts, and wherein the system treats a child-safety receipt as continuity-verified evidence for guardian-facing or regulator-facing workflows only when a fresh signed head and corresponding proofs are available, mapping any failure of such freshness or continuity checks to a HOLD or manual review state for affected reporting or certification workflows.

20. The system of claim 1, further comprising a device-level render gate configured to validate a device-bound render permit associated with the child device and an output channel, wherein the system renders or actuates model-generated content to the child device only when both (i) the episode-level child-safety permit and (ii) the device-bound render permit are valid, thereby enforcing a double-lock configuration in which a time-of-check-to-time-of-use latch is applied at both the episode layer and a device-render layer.

21. The system of claim 1, wherein the child-safety policy graph includes a harm class corresponding to suspected child sexual exploitation or child sexual abuse material (CSAM), and wherein, responsive to a CSAM harm score exceeding a threshold for an applicable age tier or jurisdiction branch, the Companion Safety Interceptor fails closed for the episode regardless of remaining risk budget, records a CSAM-specific safety event code in the child-safety receipt, and generates an evidence bundle that: (i) redacts or pseudonymizes child identifiers, (ii) includes cryptographic commitments to suspected prompts, uploads, or output fragments, and (iii) includes attestations describing a policy graph path and one or more classifiers that produced the CSAM suspicion, for transmission to a designated endpoint under an applicable reporting policy.

22. The system of claim 1, wherein the system supports an authorized testing mode in which a short-lived tester permit is minted for a vetted tester account, and wherein each authorized test run emits a child-safety receipt flagged as a tester-mode receipt to enable certification, decertification, or periodic reassessment of a child-AT companion configuration.

23. The system of claim 1, wherein the instructions further cause the system to, responsive to a parent or guardian exercising a rights action with respect to an episode, generate a rights receipt that references a child-safety receipt identifier and encodes at least a rights-type identifier, a request timestamp, an actor-role identifier, and a disposition, and append the rights receipt to a tamper-evident audit store under a namespace associated with the child or household.

24. The system of claim 1, wherein, responsive to the disposition indicating escalate, the system generates a referral packet and a referral receipt that includes at least a referral_endpoint_id and a disclosure_schema_id, applies a minimum-necessary disclosure mask, and transmits the referral packet to at least one of: (i) a designated support-agency endpoint or hotline endpoint, (ii) a designated law-enforcement endpoint, or (iii) a designated regulator endpoint, the designated endpoint being selected at least in part based on a jurisdiction branch or harm-class branch of the child-safety policy graph.

25. A computer-implemented method for governing child-AI companion interaction episodes, the method comprising:

(a) receiving an interaction request associated with a child profile and a child device;

(b) constructing a context envelope including one or more of: a child profile record, device metadata, companion configuration metadata, parent or guardian preferences, and prior safety event history;

(c) verifying, prior to determining the disposition and the risk budget, that the ICC chain has evolved in an append-only manner relative to a previously observed signed head, and traversing a child-safety policy graph constrained by an Immutable Companion Constraint (ICC) chain anchored in an append-only log implemented as a Merkle tree that issues signed heads to determine a disposition and a risk budget for an episode associated with the interaction request;

(d) when the disposition indicates permit or permit-with-conditions, minting a child-safety permit that is cryptographically signed, bound to the child profile and a parent or guardian record, and specifying at least an episode scope, an expiry, and the risk budget;

(e) routing an output stream comprising output units generated by at least one machine-learned model for the episode through a streaming Companion Safety Interceptor that, before rendering or actuation to the child device, verifies the child-safety permit and selectively forwards, truncates, buffers, replaces, or suppresses output units based on the risk budget under fail-closed semantics; and (f) generating a child-safety receipt describing the episode and appending the child-safety receipt to a child-safety receipt ledger implemented as an append-only Merkle tree log with signed heads.

26. The method of claim 25, further comprising, during the episode, detecting a high-risk pattern in input from the child or in candidate model outputs, automatically revoking the child-safety permit, truncating further output units, producing a safe fallback response, and including an escalation safety event code in the child-safety receipt.

27. The method of claim 25, further comprising recording, in the child-safety receipt, a policy path representing nodes and edges traversed in the child-safety policy graph during evaluation of the episode.

28. The method of claim 25, further comprising, responsive to a context envelope indicating that an age-assurance confidence score associated with the child is below a threshold, restricting the episode to a sandbox mode and encoding a sandbox-mode indicator in the child-safety receipt.

29. A non-transitory computer-readable medium storing instructions that, when executed by one or more processors of a child-facing AI companion device, cause the child-facing AI companion device to: (a) request, from a safety rail service, a child-safety permit associated with a child profile and a parent or guardian record; (b) receive the child-safety permit, a public key or certificate for validating a digital signature on the child-safety permit, and at least one of: (i) a device-bound render permit associated with the child-facing AI companion device and an output channel, (ii) a session binder that cryptographically binds the child-safety permit to the child-facing AI companion device or to an attested transport channel, or (iii) a cached off line authorization bundle comprising signed heads, revocation status information, and trusted-counter state for bounded off line enforcement; (c) for each candidate companion output directed to a child, verify that the child-safety permit is valid by verifying the digital signature, checking that the child-safety permit has not expired and has not been revoked, and validating the session binder, the device-bound render permit, or the cached off line authorization bundle; (d) when the child-safety permit is valid and, when applicable, the device-bound render permit is valid for the output channel, render or actuate the companion output to the child via one or more output channels; (e) when the child-safety permit is invalid, absent, expired, or revoked, when the device-bound render permit is required and invalid, or when the cached off line authorization bundle fails a freshness, revocation, or anti-replay check, suppress rendering or actuation of the companion output and render a safe fallback response indicating that an adult should be consulted.

30. The non-transitory computer-readable medium of claim 29, wherein the child-facing AI companion device includes a secure hardware element configured to store the public key, certificate, or trust anchor used for verifying the digital signature on the child-safety permit and the device-bound render permit, and wherein the instructions further cause the child-facing AI companion device to refuse to execute untrusted firmware that attempts to bypass verification of the child-safety permit or enforcement of a device-bound render permit.

* * * * *